United States Patent
Robinson et al.

(10) Patent No.: US 11,002,960 B2
(45) Date of Patent: May 11, 2021

(54) METHODS, SYSTEMS, APPARATUSES, AND DEVICES FOR FACILITATING PROVISIONING OF A VIRTUAL EXPERIENCE

(71) Applicants: Daniel Augustine Robinson, Marina Del Rey, CA (US); Nikola Vladimir Bicanic, Venice, CA (US); Glenn Thomas Snyder, Venice, CA (US)

(72) Inventors: Daniel Augustine Robinson, Marina Del Rey, CA (US); Nikola Vladimir Bicanic, Venice, CA (US); Glenn Thomas Snyder, Venice, CA (US)

(73) Assignee: Red Six Aerospace Inc., Santa Monica, CA (US)

( * ) Notice: Subject to any disclaimer, the term of this patent is extended or adjusted under 35 U.S.C. 154(b) by 0 days.

(21) Appl. No.: 16/281,513

(22) Filed: Feb. 21, 2019

(65) Prior Publication Data
US 2020/0271925 A1    Aug. 27, 2020

(51) Int. Cl.
G02B 27/00    (2006.01)
G02B 27/01    (2006.01)
H04N 13/117   (2018.01)

(52) U.S. Cl.
CPC ....... *G02B 27/0093* (2013.01); *G02B 27/017* (2013.01); *H04N 13/117* (2018.05); *G02B 2027/0127* (2013.01)

(58) Field of Classification Search
CPC .............. G02B 27/0093; G02B 27/017; G02B 2027/0127; H04N 13/117
See application file for complete search history.

(56) References Cited

U.S. PATENT DOCUMENTS

| | | |
|---|---|---|
| 2002/0053983 A1 | 5/2002 | Chamas |
| 2005/0231419 A1 | 10/2005 | Mitchell |
| 2006/0178758 A1 | 8/2006 | Koriat |
| 2010/0096491 A1 | 4/2010 | Whitelaw |
| 2012/0176497 A1 | 7/2012 | Shadmi |

(Continued)

OTHER PUBLICATIONS

Collin Krum, Ordinary Pilots Are Closer to Getting Fighter Jet-Like Augmented Reality Displays, Aug. 31, 2015, Jalopnik (https://jalopnik.com/general-aviation-pilots-closer-to-getting-fighter-jet-l-1722914390).

*Primary Examiner* — Wing H Chow
(74) *Attorney, Agent, or Firm* — FisherBroyles LLP

(57) ABSTRACT

A wearable display device for facilitating provisioning of a virtual experience is disclosed. Further, the wearable display device may include a support member configured to be mounted on a user. Further, the wearable display device may include a display device attached to the support member. Further, the wearable display device may include at least one disturbance sensor configured for sensing a disturbance in a spatial relationship between the display device and the user. Further, the wearable display device may include a processing device communicatively coupled with the display device. Further, the processing device may be configured for receiving a display data. Further, the processing device may be configured for analyzing the disturbance in the spatial relationship, and generating a correction data based on the analyzing. Further, the processing device may be configured for generating a corrected display data based on the at least one display data and the correction data.

9 Claims, 17 Drawing Sheets

(56) References Cited

U.S. PATENT DOCUMENTS

| | | | |
|---|---|---|---|
| 2013/0038510 A1* | 2/2013 | Brin | G02B 27/017 345/8 |
| 2013/0050070 A1* | 2/2013 | Lewis | G02B 27/017 345/156 |
| 2015/0234455 A1* | 8/2015 | LaValle | G02B 27/017 345/8 |
| 2017/0139205 A1 | 5/2017 | Lee | |

* cited by examiner

METHODS, SYSTEMS, APPARATUSES, AND DEVICES FOR FACILITATING PROVISIONING OF A VIRTUAL EXPERIENCE

CROSS-REFERENCE TO RELATED APPLICATIONS

The present patent application claims the priority benefit of U.S. provisional patent application Ser. No. 62/663,883 filed Apr. 27, 2018 and Ser. No. 62/690,363 filed Jun. 27, 2018; and is related to a previously filed, now pending application having Ser. No. 16/243,026 filed on Jan. 8, 2019, the disclosures of which are incorporated herein by reference.

FIELD OF THE INVENTION

Generally, the present disclosure relates to the field of data processing. More specifically, the present disclosure relates to methods, systems, apparatuses and devices for facilitating provisioning of a virtual experience.

BACKGROUND OF THE INVENTION

Display devices are used for various types of training, such as in simulators. Such display devices may display virtual reality and augmented reality content.

However, in some situations, movement of a display device with respect to a user using the display device may alter a perception of the content that may be displayed. For instance, due to a movement of the display device due to external forces, such as movement of display devices in flight helmets due to acceleration of aircraft, the user's perception of the displayed content may change, which is not desired.

Therefore, there is a need for improved methods, systems, apparatuses and devices for facilitating provisioning of a virtual experience that may overcome one or more of the above-mentioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a wearable display device for facilitating provisioning of a virtual experience is disclosed. Further, the wearable display device may include a support member configured to be mounted on a user. Further, the wearable display device may include a display device attached to the support member, configured for displaying at least one display data. Further, the wearable display device may include at least one disturbance sensor configured for sensing a disturbance in a spatial relationship between the display device and the user. Further, the wearable display device may include a processing device communicatively coupled with the display device. Further, the processing device may be configured for receiving the at least one display data. Further, the processing device may be configured for analyzing the disturbance in the spatial relationship. Further, the processing device may be configured for generating a correction data based on the analyzing. Further, the processing device may be configured for generating a corrected display data based on the at least one display data and the correction data.

According to some embodiments, a method for facilitating provisioning of a virtual experience through a wearable display device is disclosed. Further, the method may include receiving, using a communication device, a disturbance data from at least one disturbance sensor. Further, the at least one disturbance sensor may be configured for sensing a disturbance in a spatial relationship between a display device and a user. Further, the method may include analyzing, using a processing device, the disturbance in the spatial relationship. Further, the method may include generating, using the processing device, a correction data based on the analyzing. Further, the method may include generating, using the processing device, a corrected display data based on at least one display data and the correction data. Further, the method may include transmitting, using the communication device, the corrected display data to the wearable display device. Further, the wearable display device may be configured to be worn by the user. Further, the wearable display device may include a display device configured for displaying the corrected display data.

In accordance with some embodiments, a wearable display device for facilitating provisioning of a virtual experience is also disclosed. The wearable display device may include a support member configured to be mounted on a user. Further, the support member may include a deformable member. Further, the wearable display device may include a display device attached to the support member. Further, the display device may be configured for displaying at least one display data. Further, the wearable display device may include at least one disturbance sensor configured for sensing a disturbance in a spatial relationship between the display device and at least a portion of the support member. Additionally, the wearable display device may include at least one actuator coupled to the display device and the support member. Further, the at least one actuator may be configured for modifying the spatial relationship based on a correction data. Further, the wearable display device may include a processing device communicatively coupled with the display device, the at least one disturbance sensor and the at least one actuator. Accordingly, the processing device may be configured for receiving the at least one display data. Further, the processing device may be configured for analyzing the disturbance in the spatial relationship. Further, the processing device may be configured for generating the correction data based on the analyzing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
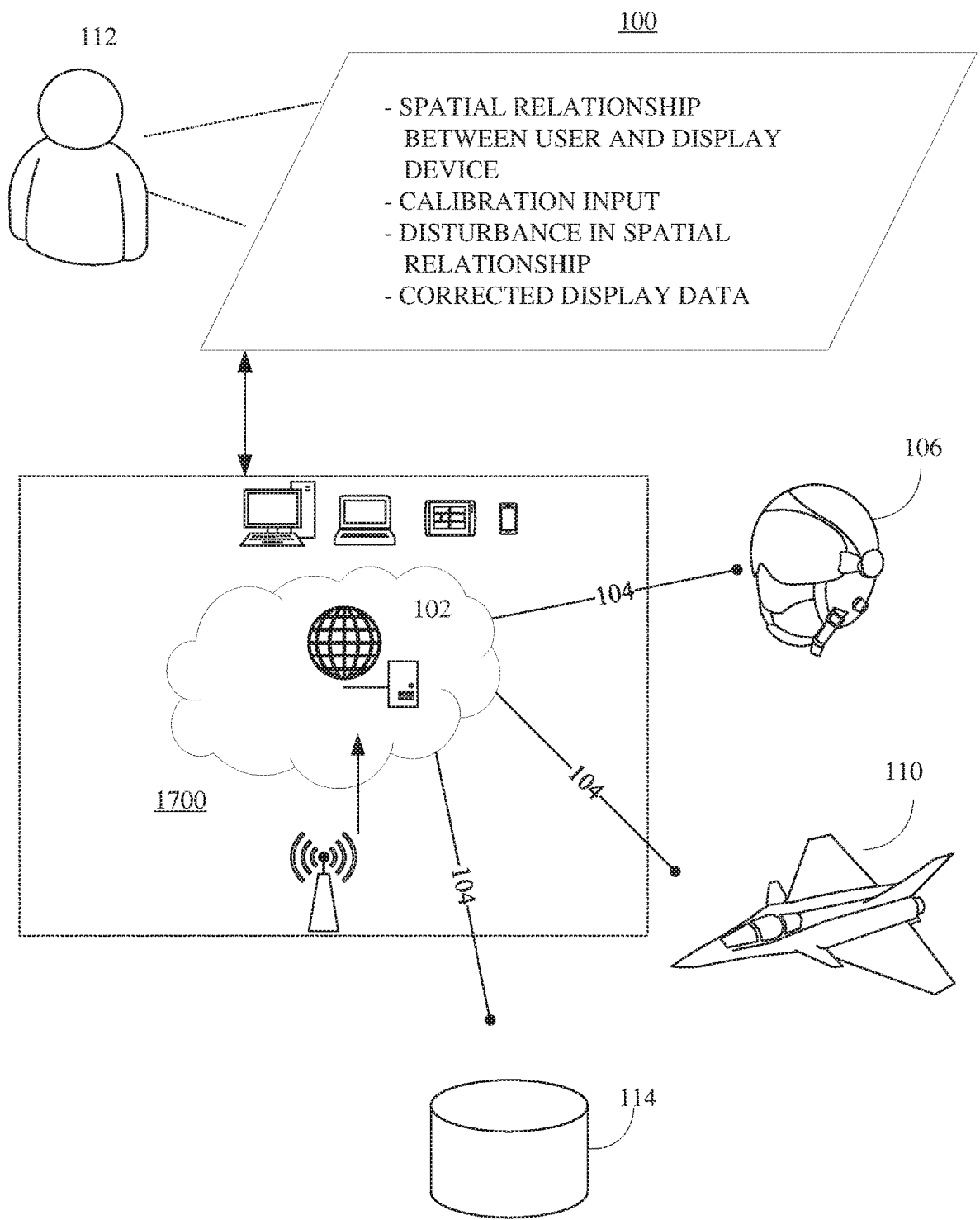
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating provisioning of a virtual experience, embodiments of the present disclosure are not limited to use only in this context.

FIG. 1 is an illustration of an online platform 100 consistent with various embodiments of the present disclosure. By way of non-limiting example, the online platform 100 to facilitate provisioning of a virtual experience may be hosted on a centralized server 102, such as, for example, a cloud computing service. The centralized server 102 may communicate with other network entities, such as, for example, an augmented and virtual reality display device 106, a sensor system 110 of an aircraft, database 114 (such as 3D model database) over a communication network 104, such as, but not limited to, the Internet. Further, users of the online platform 100 may include relevant parties such as, but not limited to, trainees, trainers, pilots, administrators, and so on.

A user 112, such as the one or more relevant parties, may access online platform 100 through a web based software application or browser. The web based software application may be embodied as, for example, but not be limited to, a website, a web application, a desktop application, and a mobile application compatible with a computing device 1700.

Figure 2:
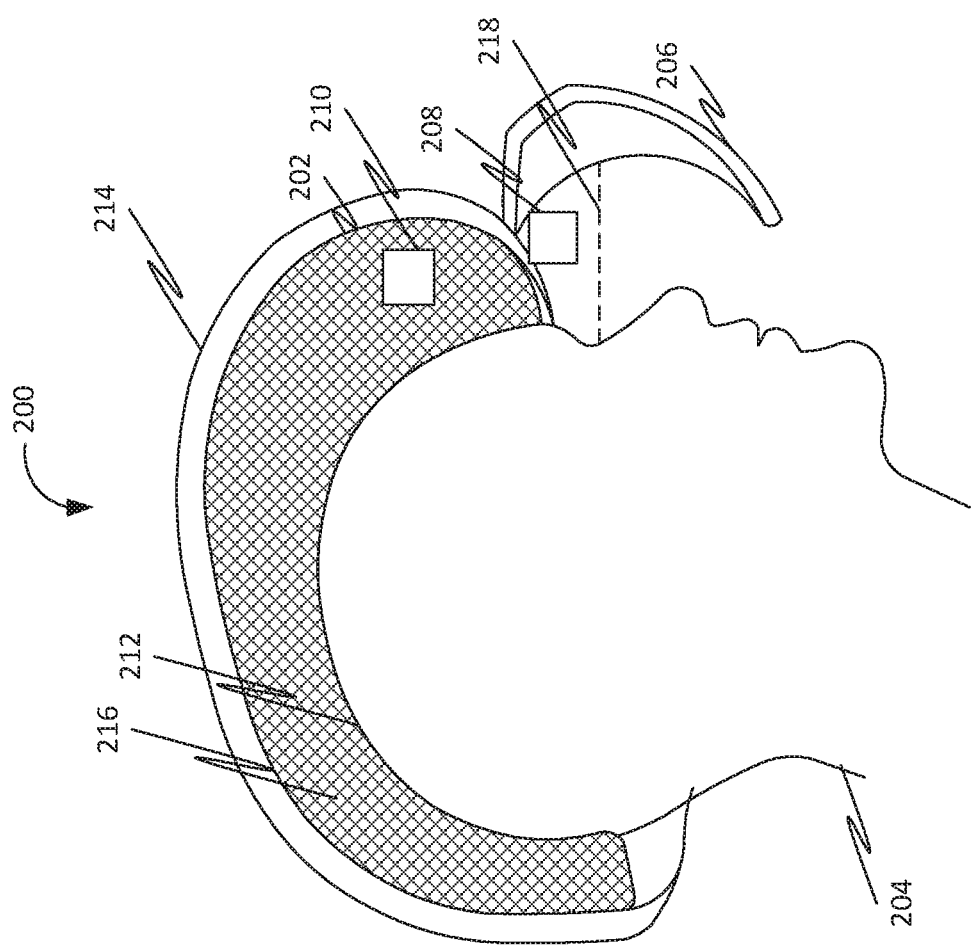
FIG. 2 shows a wearable display device for facilitating provisioning of a virtual experience, in accordance with some embodiments.

FIG. 2 shows a wearable display device 200 for facilitating provisioning of a virtual experience. Further, the wearable display device 200 may include a support member 202 configured to be mounted on a user 204. Further, the support member 202 may include a structure allowing the support member 202 to be easily mountable on the user 204. For instance, the wearable display device 200 may include a head mounted device (HMD). Further, the wearable display device 200 may include a display device 206 attached to the support member 202. For instance, if the wearable display device 200 is an HMD, the HMD may include a display device in front of one eye of the user 204, (a monocular HMD), in front of both eyes of the user 204, (a binocular HMD), an optical display device (which may reflect projected images), and so on. Further, the display device 206 may be configured for displaying at least one display data. Further, the display data may include virtual reality data related to a simulation, such as a training simulation. For instance, the training simulation may correspond to vehicular racing, such as Formula 1®, and may be used by race car drivers to train for race events. Further, in an instance, the training simulation may correspond to flight training, and may be used by air force pilots for flight training in fighter aircraft. Further, in some embodiments, the display data may include augmented reality data. Accordingly, the display data may include one or more augmented reality components overlaid on top of live image. For instance, the augmented reality data may be related to flight training including a first aircraft training simultaneously with a plurality of aircrafts in different locations. Accordingly, the augmented reality data may include augmented reality components displaying the plurality of plurality of aircrafts in different locations to a display device associated with a pilot of the first aircraft. Further, the wearable display device 200 may include at least one disturbance sensor 208 configured for sensing a disturbance in a spatial relationship between the display device 206 and the user 204. Further, the spatial relationship between the display device 206 and the user 204 may include at least one of a distance and an orientation. For instance, the spatial relationship may include an exact distance, and an orientation, such as a precise angle between the display device 206 and the eyes of the user 204.

Further, the disturbance in the spatial relationship may include a change in the at least of the distance and the orientation between the display device 206 and the user 204. Further, the disturbance in the spatial relationship may lead to an alteration in how the user 204 may view the at least one display data. For instance, if the disturbance in the spatial relationship leads to a reduction in the distance between the display device 206 and the user 204, the user 204 may perceive one or more objects in the at least one display data to be closer. For instance, if the spatial relationship between the display device 206 and the user 204 specifies a distance of "x" centimeters, and the disturbance in the spatial relationship leads to a reduction in the distance between the display device 206 and the user 204 to "y" centimeters, the user 204 may perceive the at least one display data to be closer by "x-y" centimeters.

Further, the wearable display device 200 may include a processing device 210 communicatively coupled with the display device 206. Further, the processing device 210 may be configured for receiving the at least one display data. Further, the processing device 210 may be configured for analyzing the disturbance in the spatial relationship. Further, the processing device 210 may be configured for generating a correction data based on the analyzing. Further, the processing device 210 may be configured for generating a corrected display data based on the at least one display data and the correction data. Further, the correction data may include an instruction to shift a perspective view of the at least one display data to compensate for the disturbance in the spatial relationship between the display device 206 and the user 204. Accordingly, the correction data may be generated contrary to the disturbance in the spatial relationship. For instance, the disturbance may include an angular disturbance, wherein the display device 206 may undergo an angular displacement as a result of the angular disturbance. Accordingly, the correction data may include an instruction of translation of the display data to compensate for the angular disturbance. Further, the display data may be translated along a horizontal axis of the display data, a vertical axis of the display data, a diagonal axis of the display data, and so on, to negate the angular displacement of the display data.

Further, in an instance, the disturbance may include a longitudinal disturbance, wherein the display device 206 may undergo a longitudinal displacement as a result of the longitudinal displacement. Accordingly, the correction data may include an instruction of translation of the display data to compensate for the longitudinal disturbance. Further, the display data may be projected along a distance perpendicular to a line of sight of the user 204 to negate the angular displacement of the display data. For instance, the display data may be projected along a distance perpendicular to the line of sight of the user 204 opposite to a direction of the longitudinal disturbance to compensate for the longitudinal disturbance.

Further, the support member 202 may include a head gear configured to be mounted on a head of the user 204. Further, the head gear may include a helmet configured to be worn over a crown of the head. Further, the head gear may include a shell configured to accommodate at least a part of a head of the user 204. Further, a shape of the shell may define a concavity to facilitate accommodation of at least the part of the head. Further, the shell may include an interior layer 212, an exterior layer 214 and a deformable layer 216 disposed in between the interior layer 212 and the exterior layer 214. Further, the deformable layer 216 may be configured to provide cushioning. Further, the display device 206 may be attached to at least one of the interior layer 212 and the exterior layer 214.

Further, the disturbance in the spatial relationship may be based on a deformation of the deformable layer 216 due to an acceleration of the head gear. Further, the spatial relationship may include at least one vector representing at least one position of at least one part of the display device 206 in relation to at least one eye of the user 204. Further, a vector of the at least one vector may be characterized by an orientation and a distance. For instance, the spatial relationship between the display device 206 and the user 204 may include at least one of a distance and an orientation. For instance, the spatial relationship may include an exact distance, and an orientation, such as a precise angle between the display device 206 and the eyes of the user 204. Further, the spatial relationship may describe an optimal arrangement of the display device 206 with respect to the user 204. Further, so that the optimal arrangement of the display device 206 with respect to the user 204 may allow the user to clearly view the display data without perceived distortion.

Further, in some embodiments, the at least one disturbance sensor 208 may include an accelerometer configured for sensing the acceleration. Further, in some embodiments, the at least one disturbance sensor 208 may include at least one proximity sensor configured for sensing at least one proximity between the at least one part of the display device 206 and the user 204. Further, in some embodiments, the at least one disturbance sensor 208 may include a deformation sensor configured for sensing a deformation of the deformable layer 216.

Further, in some embodiments, the display device 206 may include a see-through display device 206 configured to allow the user 204 to view a physical surrounding of the wearable device.

Further, in some embodiments, the at least one display data may include at least one object model associated with at least one object. Further, in some embodiments, the generating of the corrected display data may include applying at least one transformation to the at least one object model based on the correction data.

Further, the applying of the at least one transformation to the at least one object model based on the correction data may include translation of the display data to compensate for the angular disturbance. For instance, the correction data may include one or more instructions to translate the display data along a horizontal axis of the display data, a vertical axis of the display data, a diagonal axis of the display data, and so on, to negate the angular displacement of the display data. Accordingly, the applying of the at least one transformation to the at least one object model based on the correction data may include translation of the display data along the horizontal axis, the vertical axis, and the diagonal axis of the display data, to negate the angular displacement of the display data. Further, in an instance, if the correction data includes an instruction of translation of the display data to compensate for the longitudinal disturbance, the applying of the at least one transformation to the at least one object model based on the correction data may include translation may include projection of the display data along a distance perpendicular to a line of sight of the user 204 to negate the angular displacement of the display data. For instance, the applying of the at least one transform may include projection of the display data along a distance perpendicular to the line of sight of the user 204 opposite to a direction of the longitudinal disturbance to compensate for the longitudinal disturbance.

Further, in some embodiments, the at least one disturbance sensor 208 may include a camera configured to capture an image of each of a face of the user 204 and at least a part of the head gear. Further, the spatial relationship may include disposition of at least the part of the head gear in relation to the face of the user 204.

Further, in some embodiments, the at least one disturbance sensor 208 may include a camera disposed on the display device 206. Further, the camera may be configured to capture an image of at least a part of a face of the user 204. Further, the wearable display device 200 may include a calibration input device configured to receive a calibration input. Further, the camera may be configured to capture a reference image of at least the part of the face of the user 204 based on receiving the calibration input. Further, the calibration input may be received in an absence of the disturbance. For instance, the calibration input device may include a button configured to be pushed by the user 204 in absence of the disturbance whereupon the reference image of at least the part of the face of the user 204 may be captured. Further, the analyzing of the disturbance may include comparing the reference image with a current image of at least the part of the face of the user 204. Further, the current image may be captured by the camera in a presence of the disturbance. Further, determining the correction data may include determining at least one spatial parameter change based on the comparing. Further, the at least one spatial parameter change may correspond to at least one of a displacement of at least the part of the face relative to the camera and a rotation about at least one axis of at least the part of the face relative to the camera.

Further, in some embodiments, the generating of the corrected display data may include applying at least one image transform on the at least one display data based on the at least one spatial parameter change.

Further, in some embodiments, the wearable display device 200 may include at least one actuator coupled to the display device 206 and the support member 202. Further, the at least one actuator may be configured for modifying the spatial relationship based on a correction data.

Figure 3:
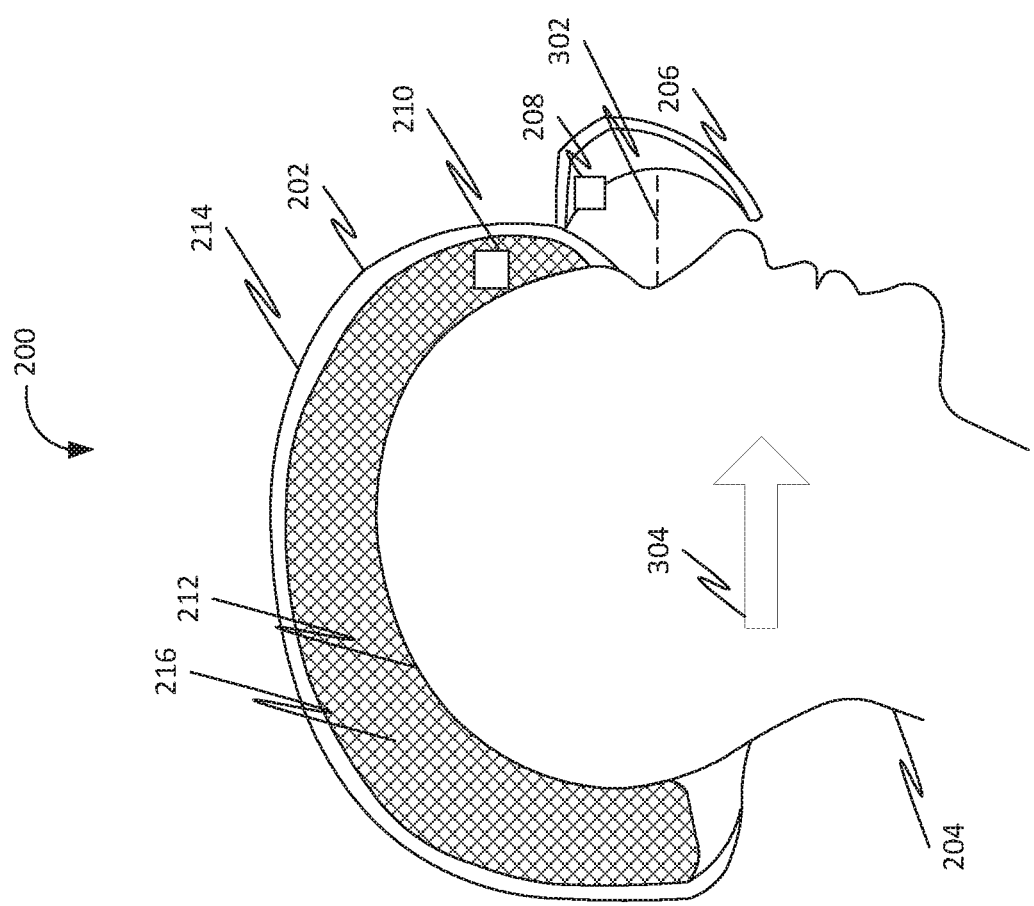
FIG. 3 shows a wearable display device for facilitating provisioning of a virtual experience with a compressed deformable layer, in accordance with some embodiments.

Further, the spatial relationship between the display device 206 and the user 204 may include at least one of a distance 218 and an orientation. Further, the disturbance in the spatial relationship between the display device 206 and the user 204 may include a change in at least one of the distance 218, the angle, the direction, and the orientation. Further, the distance 218 may include a perceived distance between the user 204 and the at least one display data. For instance, as shown in FIG. 3, the disturbance in the spatial relationship may originate due to a forward acceleration 304 of the user 204 and the wearable display device 200. Accordingly, the deformation of the deformable layer 216 may lead to a disturbance in the spatial relationship leading to a change in the distance 218 to a reduced distance 302 between the display device 206 and the user 204. Accordingly, the correction data may include transforming of the at least one display data through object level processing and restoring the at least one display data to the distance 218 from the user 204. Further, the object level processing may include projecting one or more objects in the display data at the distance 218 instead of the distance 302 to oppose the disturbance in the spatial relationship. Further, the disturbance in the spatial relationship may include a change in the angle between the display device 206 and the user 204.

Further, the angle between the display device 206 and the user 204 in the spatial relationship may be related to an original viewing angle related to the display data. Further, the original viewing angle related to the display data may be a viewing angle at which the user 204 may view the display data through the display device 206. Further, the disturbance in the spatial relationship may lead to a change in the original viewing angle related to the display data. Accordingly, the at least one display data may be transformed through pixel level processing to restore the original viewing angle related to the display data. Further, the pixel level processing may include translation of the display data to compensate for the change in the angle in the spatial relationship. Further, the display data may be translated along a horizontal axis of the display data, a vertical axis of the display data, a diagonal axis of the display data, and so on, to negate the angular displacement of the display data to compensate for the change in the angle in the spatial relationship, and to restore the original viewing angle related to the display data.

Further, in some embodiments, the actuator may be configured for modifying the spatial relationship based on the correction data. Further, the correction data may include at least one operational instruction corresponding to the actuator to oppose the disturbance in the spatial relationship, such as, but not limited to, modification of the distance, such as increasing of the distance 302 to the distance 218. Further, the correction data may include at least one operational instruction corresponding to the actuator to oppose the disturbance in the spatial relationship such as, but not limited to, the orientation opposing the disturbance in the spatial relationship.

Figure 4:
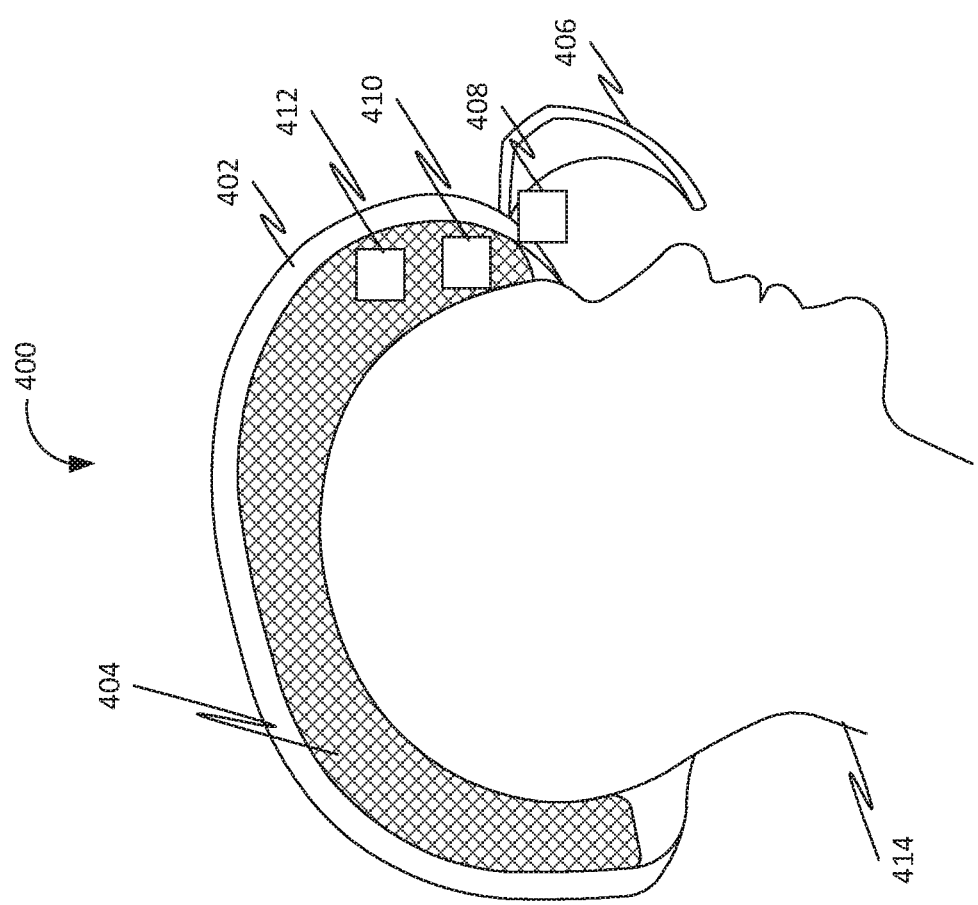
FIG. 4 shows a wearable display device including an actuator for facilitating provisioning of a virtual experience, in accordance with some embodiments.

FIG. 4 shows a wearable display device 400 for facilitating provisioning of a virtual experience, in accordance with some embodiments. Further, the wearable display device 400 may include a support member 402 configured to be mounted on a user 414. Further, the support member 402 may include a deformable member 404.

Further, the wearable display device 400 may include a display device 406 attached to the support member 402. Further, the display device 406 may be configured for displaying at least one display data.

Further, the wearable display device 400 may include at least one disturbance sensor 408 configured for sensing a disturbance in a spatial relationship between the display device 406 and the support member 402.

Further, the spatial relationship between the display device 400 and the user 414 may include at least one of a distance and an orientation. For instance, the spatial relationship may include an exact distance, and an orientation, such as a precise angle between the display device 406 and the eyes of the user 414. Further, the disturbance in the spatial relationship may include a change in the at least of the distance and the orientation between the display device 406 and the user 414. Further, the disturbance in the spatial relationship may lead to an alteration in how the user 414 may view the at least one display data. For instance, if the disturbance in the spatial relationship leads to a reduction in the distance between the display device 406 and the user 414, the user 414 may perceive one or more objects in the at least one display data to be closer. For instance, if the spatial relationship between the display device 406 and the user 414 specifies a distance of "x" centimeters, and the disturbance in the spatial relationship leads to a reduction in the distance between the display device 406 and the user 414 to "y" centimeters, the user 414 may perceive the at least one display data to be closer by "x-y" centimeters.

Further, the wearable display device 400 may include at least one actuator 410 coupled to the display device 406 and the support member 402. Further, the at least one actuator 410 may be configured for modifying the spatial relationship between the display device 406 and the user 414. Further, in an embodiment, the at least one actuator 410 may be configured for modifying the spatial relationship to oppose the disturbance in the spatial relationship. Further, in an embodiment, the at least one actuator 410 may be configured for modifying the spatial relationship based on the correction data. For instance, the at least one actuator 410 may be configured for actuating a connected motor, such as an AC motor or a DC motor controlling an extendable rail mechanism connecting the display device 406 and the support member 402. For instance, if the disturbance in the spatial relationship leads to a reduction in the distance between the display device 406 and the user 414, the user 414 may perceive one or more objects in the at least one display data to be closer. For instance, if the spatial relationship between the display device 406 and the user 414 specifies a distance of "x" centimeters, and the disturbance in the spatial relationship leads to a reduction in the distance between the display device 406 and the user 414 to "y" centimeters, the user 414 may perceive the at least one display data to be closer by "x-y" centimeters. Accordingly, the at least one actuator 410 may transmit an actuating signal to the connected motor to increase the distance between the display device 406 and the user 414 by "x-y" centimeters to the distance of "x" centimeters.

Further, in an embodiment, the at least one actuator 410 may be connected to a servo motor configured to control the angle in the spatial relationship through a 6-axis rotary mechanism. Accordingly, if the disturbance in the spatial relationship leads to a change in the angle between the display device 406 and the user 414, the user 414 may perceive the at least one display data to be skewed. For instance, if the spatial relationship between the display device 406 and the user 414 specifies the display device 406 to be significantly parallel to the user 414, and the disturbance in the spatial relationship leads the display device 406 to be skewed by an angle of 30 degrees towards the user 414, the at least one actuator 410 may transmit an actuating signal to the connected servo motor, which may alter the angle in the spatial relationship by 30 degrees oppositely to the disturbance in the spatial relationship through the 6-axis rotary mechanism.

Further, the wearable display device 400 may include a processing device 412 communicatively coupled with the display device 406. Further, the processing device 412 may be configured for receiving the at least one display data. Further, the processing device 412 may be configured for analyzing the disturbance in the spatial relationship. Further, the processing device 412 may be configured for generating the actuation data based on the analyzing.

Figure 5:
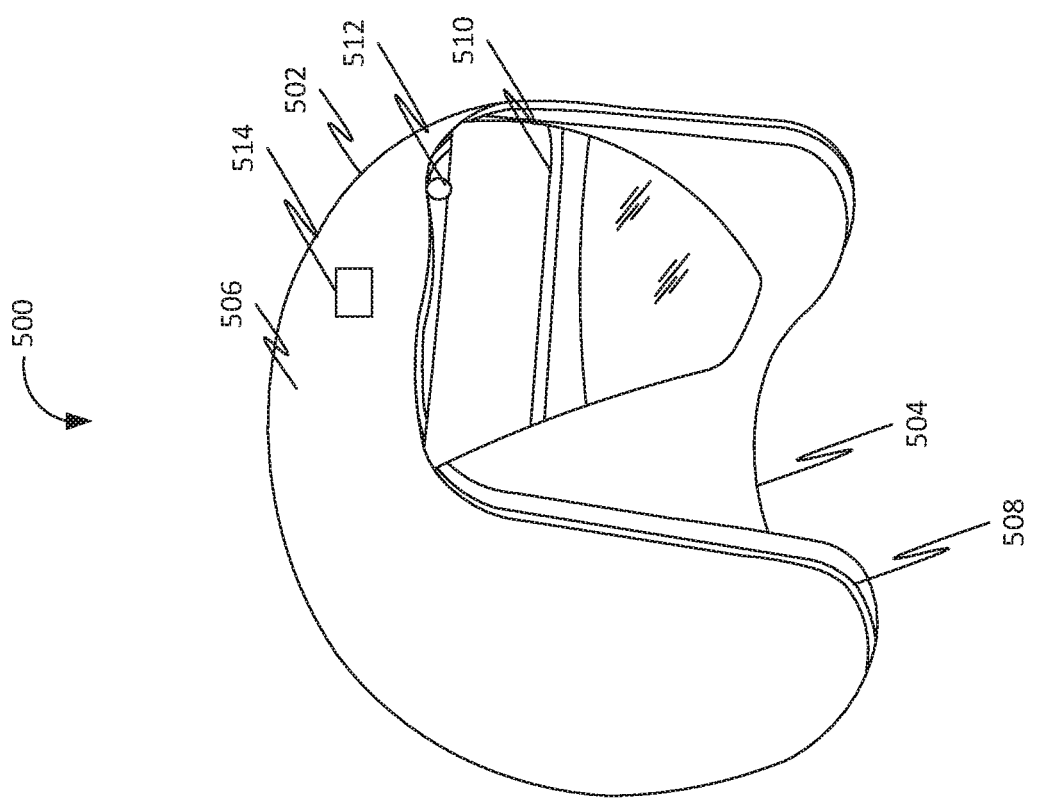
FIG. 5 shows a wearable head gear for facilitating provisioning of a virtual experience, in accordance with some embodiments.

FIG. 5 shows a wearable display device 500 for facilitating provisioning of a virtual experience, in accordance with some embodiments. Further, the wearable display device 500 may include a head gear 502 including a shell configured to accommodate at least a part of a head of the user. Further, a shape of the shell may define a concavity to facilitate accommodation of at least the part of the head. Further, the shell may include an interior layer 504, an exterior layer 506 and a deformable layer 508 disposed in between the interior layer 504 and the exterior layer 506. Further, the deformable layer 508 may be configured to provide cushioning.

Further, the wearable display device 500 may include a display device 510 attached to at least one of the interior layer 504 and the exterior layer 506. Further, the display device 510 may be configured for displaying at least one display data.

Further, the wearable display device 510 may include at least one disturbance sensor 512 configured for sensing a disturbance in a spatial relationship between the display device 510 and the at least one of the interior layer 504 and the exterior layer 506.

Further, the wearable display device 500 may include a processing device 514 communicatively coupled with the display device 510. Further, the processing device 514 may be configured for receiving the at least one display data.

Further, the processing device 514 may be configured for analyzing a disturbance in the spatial relationship. Further, the processing device 514 may be configured for generating a correction data based on the analyzing. Further, the processing device 514 may be configured for generating a corrected display data based on the at least one display data and the correction data. Further, the display device 510 may be configured to display the corrected display data.

Figure 6:
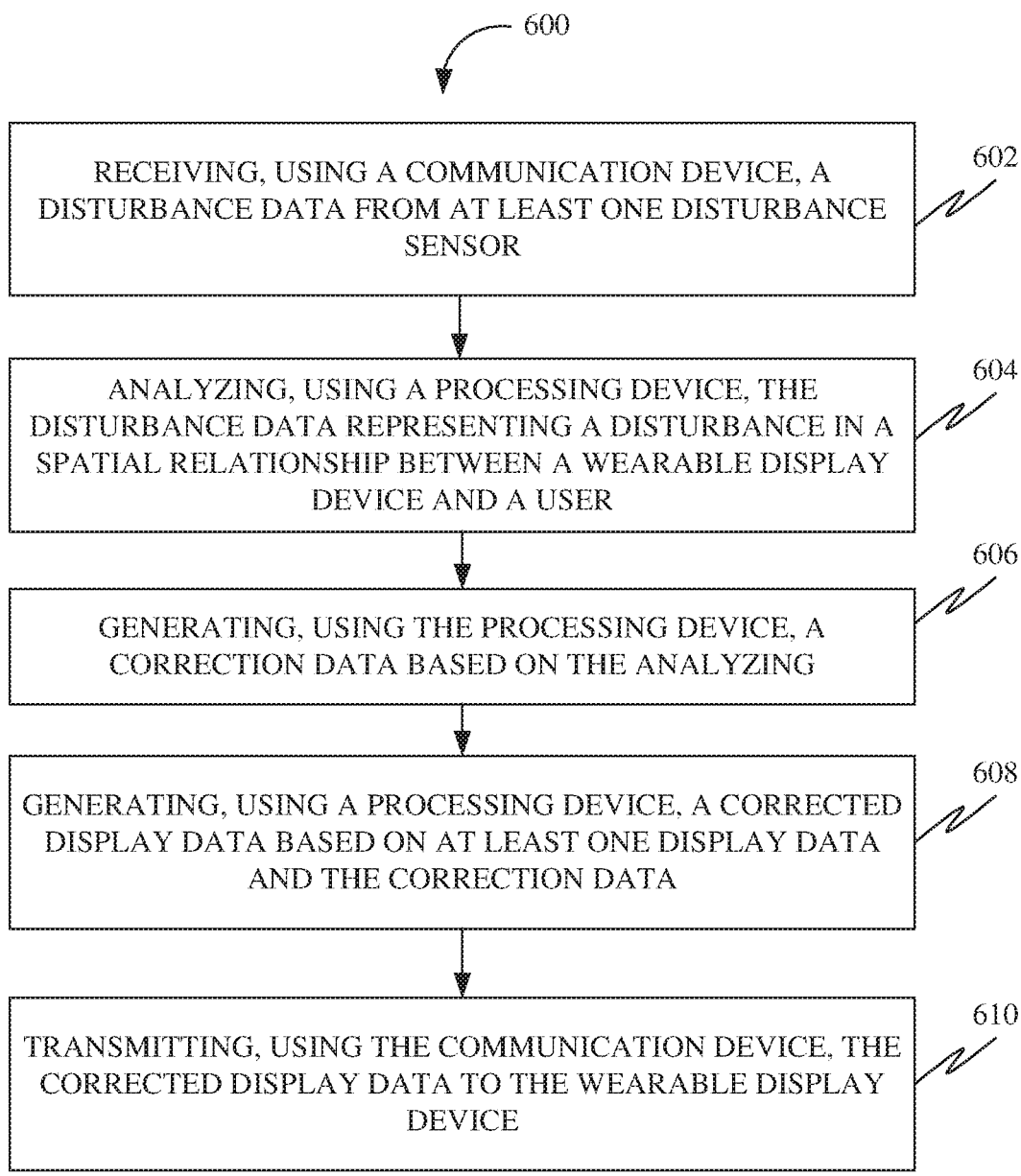
FIG. 6 shows a method for facilitating provisioning of a virtual experience through a wearable display device, in accordance with some embodiments.

FIG. 6 shows a method 600 for facilitating provisioning of a virtual experience through a wearable display device, such as the wearable display device 200, in accordance with some embodiments.

At 602, the method 600 may include receiving, using a communication device, a disturbance data from at least one disturbance sensor. Further, the at least one disturbance sensor may be configured for sensing a disturbance in a spatial relationship between a display device and a user. At 604, the method 600 may include analyzing, using a processing device, the disturbance in the spatial relationship. At 606, the method 600 may include generating, using the processing device, a correction data based on the analyzing. At 608, the method 600 may include generating, using the processing device, a corrected display data based on at least one display data and the correction data. At 610, the method 600 may include transmitting, using the communication device, the corrected display data to the wearable display device. Further, the wearable display device may be configured to be worn by the user. Further, the wearable display device may include a display device. Further, the display device may be configured for displaying the corrected display data.

Figure 7:
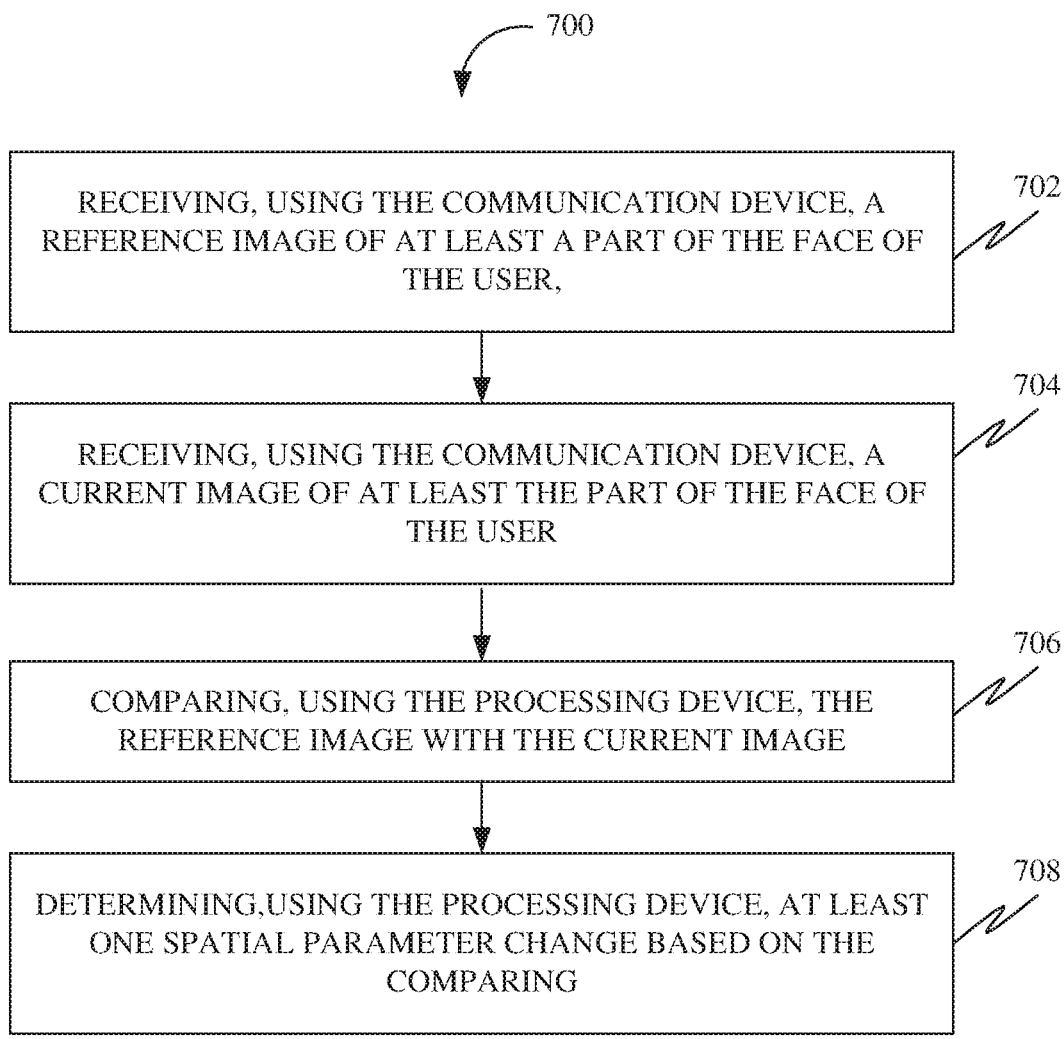
FIG. 7 shows a method for determining a spatial parameter change associated with a wearable display device in relation to a user, in accordance with some embodiments.

FIG. 7 shows a method 700 for determining a spatial parameter change, in accordance with some embodiments. At 702, the method 700 may include receiving, using the communication device, a reference image of at least a part of the face of the user. Further, the at least one disturbance sensor may include a camera disposed on the display device. Further, the camera may be configured to capture an image of at least the part of a face of the user. Further, the wearable display device may include a calibration input device configured to receive a calibration input. Further, the camera may be configured to capture the reference image of at least the part of the face of the user based on receiving the calibration input. Further, the calibration input may be received in an absence of the disturbance.

At 704, the method 700 may include receiving, using the communication device, a current image of at least the part of the face of the user. Further, the current image may be captured by the camera in a presence of the disturbance. At 706, the method 700 may include comparing, using the processing device, the reference image with the current image. At 708, the method 700 may include determining using the processing device, at least one spatial parameter change based on the comparing. Further, the at least one spatial parameter change may correspond to at least one of a displacement of at least the part of the face relative to the camera and a rotation, about at least one axis, of at least the part of the face relative to the camera. Further, the generating of the corrected display data may include applying at least one image transform on the at least one display data based on the at least one spatial parameter change. Further, the part of the face may include the eyes of the user. Further, the reference image may include at least one reference spatial parameter corresponding to the eyes. Further, the current image may include at least one current spatial parameter corresponding to the eyes. Further, the at least one spatial parameter change may be independent of a gaze of the eyes.

Figure 8:
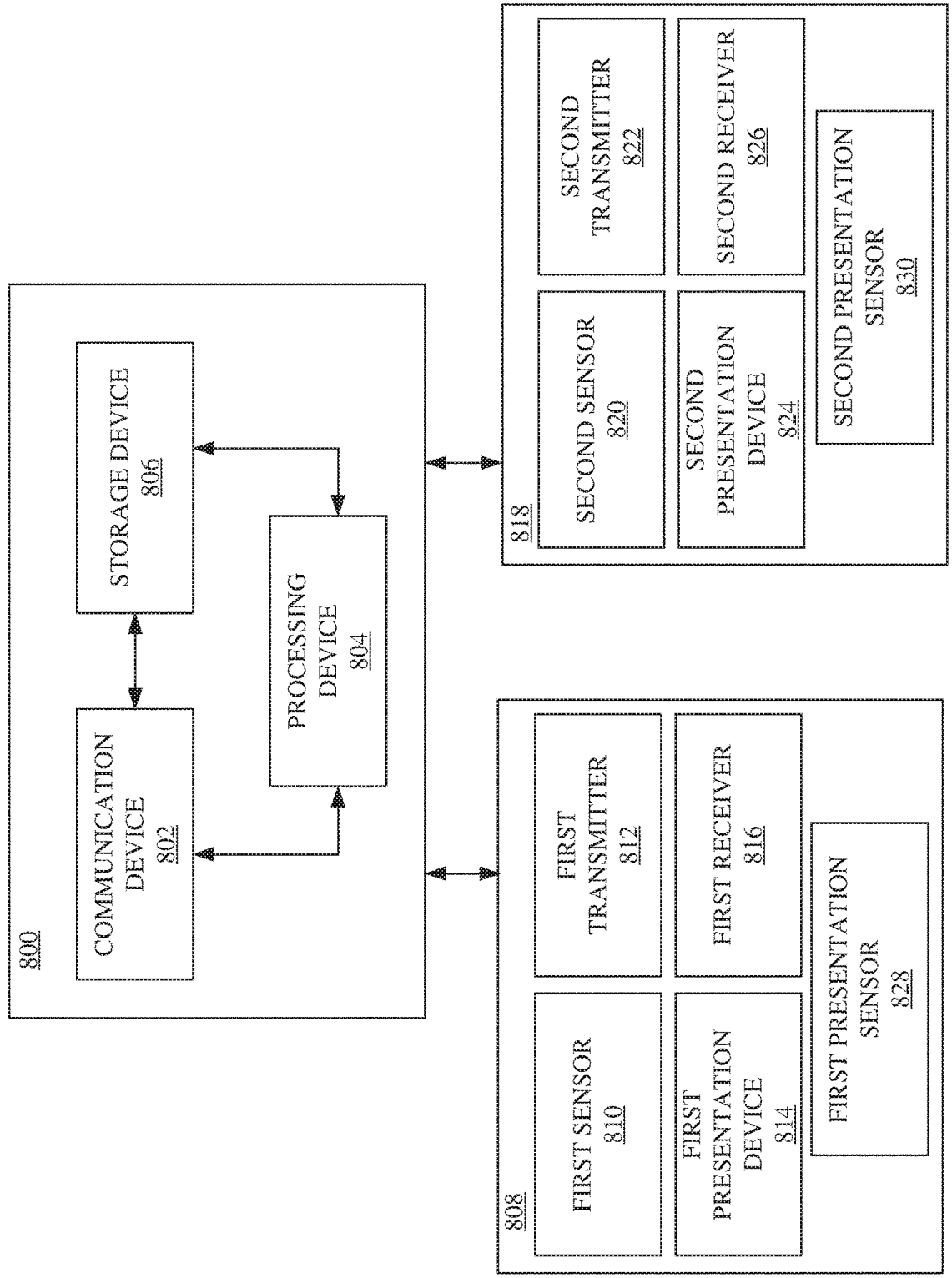
FIG. 8 is a block diagram of a system for facilitating provisioning of a virtual experience in accordance with some embodiments.

FIG. 8 is a block diagram of a system 800 for facilitating provisioning of a virtual experience in accordance with some embodiments. The system 800 may include a communication device 802, a processing device 804 and a storage device 806.

The communication device 802 may be configured for receiving at least one first sensor data corresponding to at least one first sensor 810 associated with a first vehicle 808. Further, the at least one first sensor 810 may be communicatively coupled to a first transmitter 812 configured for transmitting the at least one first sensor data over a first communication channel. In some embodiments, the first vehicle 808 may be a first aircraft. Further, the first user may be a first pilot.

Further, the communication device 802 may be configured for receiving at least one second sensor data corresponding to at least one second sensor 820 associated with a second vehicle 818. Further, the at least one second sensor 820 may be communicatively coupled to a second transmitter 822 configured for transmitting the at least one second sensor data over a second communication channel. In some embodiments, the second vehicle 818 may be a second aircraft. Further, the second user may be a second pilot.

In some embodiments, the at least one first sensor data may be received from a first On-Board-Diagnostics (OBD) system of the first vehicle 808, the at least one second sensor data may be received from a second On-Board-Diagnostics (OBD) system of the second vehicle 818.

Further, the communication device 802 may be configured for receiving at least one first presentation sensor data from at least one first presentation sensor 828 associated with the first vehicle 808. Further, the at least one first presentation sensor 828 may be communicatively coupled to the first transmitter configured for transmitting the at least one first presentation sensor data over the first communication channel. Further, in an embodiment, the at least one first presentation sensor 828 may include a disturbance sensor, such as the disturbance sensor 208 configured for sensing a disturbance in a first spatial relationship between at least one first presentation device 814 associated with the first vehicle 808, and the first user. Further, the spatial relationship between the at least one first presentation device 814 and the first user may include at least one of a distance and an orientation. For instance, the first spatial relationship may include an exact distance, and an orientation, such as a precise angle between the at least one first presentation device 814 and the eyes of the first user. Further, the disturbance in the first spatial relationship may include a change in the at least of the distance and the orientation between the at least one first presentation device 814 and the first user.

Further, the communication device 802 may be configured for receiving at least one second presentation sensor data from at least one second presentation sensor 830 associated with the second vehicle 818.

Further, in an embodiment, the at least one second presentation sensor 830 may include a disturbance sensor configured for sensing a disturbance in a second spatial relationship between at least one second presentation device 824 associated with the second vehicle 818, and the second user.

Further, the at least one second presentation sensor 830 may be communicatively coupled to the first transmitter configured for transmitting the at least one second presentation sensor data over the second communication channel.

Further, the communication device 802 may be configured for transmitting at least one first optimized presentation data to at least one first presentation device 814 associated with the first vehicle 808. Further, in an embodiment, at least one first presentation device 814 may include a wearable display device facilitating provisioning of a virtual experience, such as the wearable display device 200. Further, in an embodiment, the at least one first optimized presentation data may include a first corrected display data generated based on a first correction data.

Further, the at least one first presentation device 814 may include a first receiver 816 configured for receiving the at least one first optimized presentation data over the first communication channel. Further, the at least one first presentation device 814 may be configured for presenting the at least one first optimized presentation data.

Further, the communication device 802 may be configured for transmitting at least one second optimized presentation data to at least one first presentation device 814 associated with the first vehicle 808. Further, the first receiver 816 may be configured for receiving the at least one second optimized presentation data over the first communication channel. Further, the at least one first presentation device 814 may be configured for presenting the at least one second optimized presentation data.

Further, in an embodiment, the at least one second optimized presentation data may include a second corrected display data generated based on a second correction data.

Further, the communication device 802 may be configured for transmitting at least one second optimized presentation data to at least one second presentation device 824 associated with the second vehicle 818. Further, the at least one second presentation device 824 may include a second receiver 826 configured for receiving the at least one second optimized presentation data over the second communication channel. Further, the at least one first presentation device 824 may be configured for presenting the at least one second optimized presentation data.

Further, the processing device 804 may be configured for analyzing the at least one first presentation sensor data associated with the first vehicle 808.

Further, the processing device 804 may be configured for analyzing the at least one second presentation sensor data associated with the second vehicle 818.

Further, the processing device 804 may be configured for generating the first correction data based on the analyzing the at least one first presentation sensor data associated with the first vehicle 808. Further, the first correction data may include an instruction to shift a perspective view of the at least one first optimized presentation data to compensate for the disturbance in the first spatial relationship between the first presentation device 814 and the first user. Accordingly, the first correction data may be generated contrary to the disturbance in the first spatial relationship. For instance, the disturbance may include an angular disturbance, wherein the first presentation device 814 may undergo an angular displacement as a result of the angular disturbance. Accordingly, the first correction data may include an instruction of translation to generate the first corrected display data included in the first optimized presentation data to compensate for the angular disturbance.

Further, the processing device 804 may be configured for generating the second correction data based on the analyzing the at least one second presentation sensor data associated with the second vehicle 818. Further, the second correction data may include an instruction to shift a perspective view of the at least one second optimized presentation data to compensate for the disturbance in the second spatial relationship between the second presentation device 824 and the second user. Accordingly, the second correction data may be generated contrary to the disturbance in the second spatial relationship. For instance, the disturbance may include an angular disturbance, wherein the second presentation device 824 may undergo an angular displacement as a result of the angular disturbance. Accordingly, the second correction data may include an instruction of translation to generate the second corrected display data included in the second optimized presentation data to compensate for the angular disturbance.

Further, the processing device 804 may be configured for generating the at least one first optimized presentation data based on the at least one second sensor data.

Further, the processing device 804 may be configured for generating the at least one first optimized presentation data based on the at least one first presentation sensor data.

Further, the processing device 804 may be configured for generating the at least one second optimized presentation data based on the at least one first sensor data.

Further, the processing device 804 may be configured for generating the at least one second optimized presentation data based on the at least one second presentation sensor data.

Further, the storage device 806 may be configured for storing each of the at least one first optimized presentation data and the at least one second optimized presentation data.

In some embodiments, the at least one first sensor 810 may include one or more of a first orientation sensor, a first motion sensor, a first accelerometer, a first location sensor, a first speed sensor, a first vibration sensor, a first temperature sensor, a first light sensor and a first sound sensor. Further, the at least one second sensor 820 may include one or more of a second orientation sensor, a second motion sensor, a second accelerometer, a second location sensor, a second speed sensor, a second vibration sensor, a second temperature sensor, a second light sensor and a second sound sensor.

In some embodiments, the at least one first sensor 810 may be configured for sensing at least one first physical variable associated with the first vehicle 808. Further, the at least one second sensor 820 may be configured for sensing at least one second physical variable associated with the second vehicle 818. In further embodiments, the at least one first physical variable may include one or more of a first orientation, a first motion, a first acceleration, a first location, a first speed, a first vibration, a first temperature, a first light intensity and a first sound. Further, the at least one second physical variable may include one or more of a second orientation, a second motion, a second acceleration, a second location, a second speed, a second vibration, a second temperature, a second light intensity and a second sound.

In some embodiments, the at least one first sensor 810 may include a first environmental sensor configured for sensing a first environmental variable associated with the first vehicle 808. Further, the at least one second sensor 820 may include a second environmental sensor configured for sensing a second environmental variable associated with the second vehicle 818.

In some embodiments, the at least one first sensor 810 may include a first user sensor configured for sensing a first user variable associated with a first user of the first vehicle 808. Further, the at least one second sensor 820 may include a second user sensor configured for sensing a second user variable associated with a second user of the second vehicle 818.

In further embodiments, the first user variable may include a first user location and a first user orientation. Further, the second user variable may include a second user location and a second user orientation. Further, the first presentation device may include a first head mount display. Further, the second presentation device may include a second head mount display.

In further embodiments, the first head mount display may include a first user location sensor of the at least one first sensor 810 configured for sensing the first user location and a first user orientation sensor of the at least one first sensor 810 configured for sensing the first user orientation. The first head mount display is explained in further detail in conjunction with FIG. 9 below. Further, the second head mount display may include a second user location sensor of the at least one second sensor 820 configured for sensing the second user location, a second user orientation sensor of the at least one second sensor 820 configured for sensing the second user orientation.

In further embodiments, the first vehicle 808 may include a first user location sensor of the at least one first sensor 810 configured for sensing the first user location and a first user orientation sensor of the at least one first sensor 810 configured for sensing the first user orientation. Further, the second vehicle 818 may include a second user location sensor of the at least one second sensor 820 configured for sensing the second user location, a second user orientation sensor of the at least one second sensor 820 configured for sensing the second user orientation.

In further embodiments, the first user orientation sensor may include a first gaze sensor configured for sensing a first eye gaze of the first user. Further, the second user orientation sensor may include a second gaze sensor configured for sensing a second eye gaze of the second user.

In further embodiments, the first user location sensor may include a first proximity sensor configured for sensing the first user location in relation to the at least one first presentation device 814. Further, the second user location sensor may include a second proximity sensor configured for sensing the second user location in relation to the at least one second presentation device 824.

Further, in some embodiments, the at least one first presentation sensor 828 may include at least one sensor configured for sensing at least one first physical variable associated with the first presentation device 814 associated with the first vehicle 808, such as due to a G-Force, a frictional force, and an uneven movement of the first vehicle 808. For instance, the at least one first presentation sensor 828 may include at least one camera configured to monitor a movement of the first presentation device 814 associated with the first vehicle 808. Further, the at least one first presentation sensor 828 may include at least one accelerometer sensor configured to monitor an uneven movement of the first presentation device 814 associated with the first vehicle 808, such as due to a G-Force, a frictional force, and an uneven movement of the first vehicle 808. Further, the at least one first presentation sensor 828 may include at least one gyroscope sensor configured to monitor an uneven orientation of the first presentation device 814 associated with the first vehicle 808, such as due to a G-Force, a frictional force, and an uneven movement of the first vehicle 808.

Further, the at least one second presentation sensor 830 may include at least one sensor configured for sensing at least one first physical variable associated with the second presentation device 824 associated with the second vehicle 818, such as due to a G-Force, a frictional force, and an uneven movement of the second vehicle 818. For instance, the at least one second presentation sensor 830 may include at least one camera configured to monitor a movement of the second presentation device 824 associated with the second vehicle 818. Further, the at least one second presentation sensor 830 may include at least one accelerometer sensor configured to monitor an uneven movement of the second presentation device 824 associated with the second vehicle 818, such as due to a G-Force, a frictional force, and an uneven movement of the second vehicle 818. Further, the at least one second presentation sensor 830 may include at least one gyroscope sensor configured to monitor an uneven orientation of the second presentation device 824 associated with the second vehicle 818, such as due to a G-Force, a frictional force, and an uneven movement of the second vehicle 818.

In some embodiments, the first head mount display may include a first see-through display device. Further, the second head mount display may include a second see-through display device.

In some embodiments, the first head mount display may include a first optical marker configured to facilitate determination of one or more of the first user location and the first user orientation. Further, the at least one first sensor 810 may include a first camera configured for capturing a first image of the first optical marker. Further, the at least one first sensor 810 may be communicatively coupled to a first processor associated with the vehicle. Further, the first processor may be configured for determining one or more of the first user location and the first user orientation based on analysis of the first image. Further, the second head mount display may include a second optical marker configured to facilitate determination of one or more of the second user location and the second user orientation. Further, the at least one second sensor 820 may include a second camera configured for capturing a second image of the second optical marker. Further, the at least one second sensor 820 may be communicatively coupled to a second processor associated with the vehicle. Further, the second processor may be configured for determining one or more of the second user location and the second user orientation based on analysis of the second image.

In some embodiments, the first presentation device may include a first see-through display device disposed in a first windshield of the first vehicle 808. Further, the second presentation device may include a second see-through display device disposed in a second windshield of the second vehicle 818.

In some embodiments, the first vehicle 808 may include a first watercraft, a first land vehicle, a first aircraft and a first amphibious vehicle. Further, the second vehicle 818 may include a second watercraft, a second land vehicle, a second aircraft and a second amphibious vehicle.

In some embodiments, the at least one may include one or more of a first visual data, a first audio data and a first haptic data. Further, the at least one second optimized presentation data may include one or more of a second visual data, a second audio data and a second haptic data.

In some embodiments, the at least one first presentation device 814 may include at least one environmental variable actuator configured for controlling at least one first environmental variable associated with the first vehicle 808 based on the first optimized presentation data. Further, the at least one second presentation device 824 may include at least one environmental variable actuator configured for controlling at least one second environmental variable associated with the second vehicle 818 based on the second optimized presentation data. In further embodiments, the at least one first environmental variable may include one or more of a first temperature level, a first humidity level, a first pressure level, a first oxygen level, a first ambient light, a first ambient sound, a first vibration level, a first turbulence, a first motion, a first speed, a first orientation and a first acceleration, the at least one second environmental variable may include one or more of a second temperature level, a second humidity level, a second pressure level, a second oxygen level, a second ambient light, a second ambient sound, a second vibration level, a second turbulence, a second motion, a second speed, a second orientation and a second acceleration.

In some embodiments, the first vehicle 808 may include each of the at least one first sensor 810 and the at least one first presentation device 814. Further, the second vehicle 818 may include each of the at least one second sensor 820 and the at least one second presentation device 824.

In some embodiments, the storage device 806 may be further configured for storing a first three-dimensional model corresponding to the first vehicle 808 and a second three-dimensional model corresponding to the second vehicle 818. Further, the generating of the first optimized presentation data may be based further on the second three-dimensional model. Further, the generating of the second optimized presentation data may be based further on the first three-dimensional model.

Further, the generating of the first optimized presentation data may be based on the determining of the unwanted movement of the associated with the first presentation device 814 associated with the first vehicle 808, such as due to a G-Force, a frictional force, and an uneven movement of the first vehicle 808. For instance, the at least one first presentation sensor 828 may include at least one camera configured to monitor a movement of the first presentation device 814 associated with the first vehicle 808. Further, the at least one first presentation sensor 828 may include at least one accelerometer sensor configured to monitor an uneven movement of the first presentation device 814 associated with the first vehicle 808, such as due to a G-Force, a frictional force, and an uneven movement of the first vehicle 808. Further, the at least one first presentation sensor 828 may include at least one gyroscope sensor configured to monitor an uneven orientation of the first presentation device 814 associated with the first vehicle 808, such as due to a G-Force, a frictional force, and an uneven movement of the first vehicle 808.

Further, the generating of the second optimized presentation data may be based on the determining of the unwanted movement of the second presentation device 824 associated with the second vehicle 818, such as due to a G-Force, a frictional force, and an uneven movement of the second vehicle 818. For instance, the at least one second presentation sensor 830 may include at least one camera configured to monitor a movement of the second presentation device 824 associated with the second vehicle 818. Further, the at least one second presentation sensor 830 may include at least one accelerometer sensor configured to monitor an uneven movement of the second presentation device 824 associated with the second vehicle 818, such as due to a G-Force, a frictional force, and an uneven movement of the second vehicle 818. Further, the at least one second presentation sensor 830 may include at least one gyroscope sensor configured to monitor an uneven orientation of the second presentation device 824 associated with the second vehicle 818, such as due to a G-Force, a frictional force, and an uneven movement of the second vehicle 818.

In some embodiments, the communication device 802 may be further configured for receiving an administrator command from an administrator device. Further, the generating of one or more of the first optimized presentation data and the second optimized presentation data may be based further on the administrator command. In further embodiments, the at least one first presentation model may include at least one first virtual object model corresponding to at least one first virtual object. Further, the at least one second presentation model may include at least one second virtual object model corresponding to at least one second virtual object. Further, the generating of the at least one first virtual object model may be independent of the at least one second sensor model. Further, the generating of the at least one second virtual object model may be independent of the at least one first sensor model. Further, the generating of one or more of the at least one first virtual object model and the at least one second virtual object model may be based on the administrator command. Further, the storage device 806 may be configured for storing the at least one first virtual object model and the at least one second virtual object model.

In further embodiments, the administrator command may include a virtual distance parameter. Further, the generating of each of the at least one first optimized presentation data and the at least one second optimized presentation data may be based on the virtual distance parameter.

In further embodiments, the at least one first sensor data may include at least one first proximity data corresponding to at least one first external real object in a vicinity of the first vehicle 808. Further, the at least one second sensor data may include at least one second proximity data corresponding to at least one second external real object in a vicinity of the second vehicle 818. Further, the generating of the at least one first optimized presentation data may be based further on the at least one second proximity data. Further, the generating of the at least one second optimized presentation data may be based further on the at least one first proximity data. In further embodiments, the at least one first external real object may include a first cloud, a first landscape feature, a first man-made structure and a first natural object. Further, the at least one second external real object may include a second cloud, a second landscape feature, a second man-made structure and a second natural object.

In some embodiments, the at least one first sensor data may include at least one first image data corresponding to at least one first external real object in a vicinity of the first vehicle 808. Further, the at least one second sensor data may include at least one second image data corresponding to at least one second external real object in a vicinity of the second vehicle 818. Further, the generating of the at least one first optimized presentation data may be based further on the at least one second image data. Further, the generating of the at least one second optimized presentation data may be based further on the at least one first image data.

In some embodiments, the communication device 802 may be further configured for transmitting a server authentication data to the first receiver 816. Further, the first receiver 816 may be communicatively coupled to first processor associated with the first presentation device. Further, the first processor may be communicatively coupled to a first memory device configured to store a first authentication data. Further, the first processor may be configured for performing a first server authentication based on the first authentication data and the server authentication data. Further, the first processor may be configured for controlling presentation of the at least one first optimized presentation data on the at least one first presentation device 814 based on the first server authentication. Further, the communication device 802 may be configured for transmitting a server authentication data to the second receiver 826. Further, the second receiver 826 may be communicatively coupled to second processor associated with the second presentation device. Further, the second processor may be communicatively coupled to a second memory device configured to store a second authentication data. Further, the second processor may be configured for performing a second server authentication based on the second authentication data and the server authentication data. Further, the second processor may be configured for controlling presentation of the at least one second optimized presentation data on the at least one second presentation device 824 based on the second server authentication. Further, the communication device 802 may be configured for receiving a first client authentication data from the first transmitter 812. Further, the storage device 806 may be configured for storing the first authentication data. Further, the communication device 802 may be configured for and receiving a second client authentication data from the second transmitter 822. Further, the storage device 806 may be configured for storing the second authentication data. Further, the processing device 804 may be further configured for performing a first client authentication based on the first client authentication data and the first authentication data. Further, the generating of the at least one second optimized presentation data may be further based on the first client authentication. Further, the processing device 804 may be configured for performing a second client authentication based on the second client authentication data and the second authentication data. Further, the generating of the at least one first optimized presentation data may be further based on the second client authentication.

Figure 9:
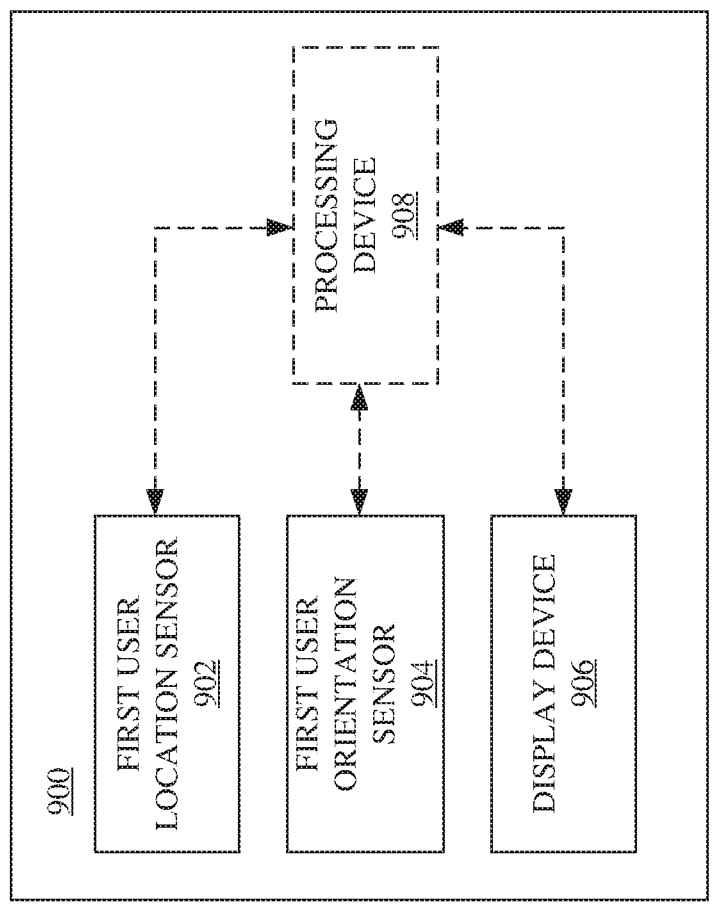
FIG. 9 is a block diagram of a first head mount display for facilitating provisioning of a virtual experience in accordance with some embodiments.

FIG. 9 is a block diagram of a first head mount display 900 for facilitating provisioning of a virtual experience in accordance with some embodiments. The first head mount display 900 may include a first user location sensor 902 of the at least one first sensor configured for sensing the first user location and a first user orientation sensor 904 of the at least one first sensor configured for sensing the first user orientation.

Further, the first head mount display 900 may include a display device 906 to present visuals. Further, in an embodiment, the display device 906 may be configured for displaying the first optimized display data, as generated by the processing device 804.

Further, the first head mount display 900 may include a processing device 908 configured to obtain sensor data from the first user location sensor 902 and the first user orientation sensor 904. Further, the processing device 908 may be configured to send visuals to the display device 906.

Figure 10:
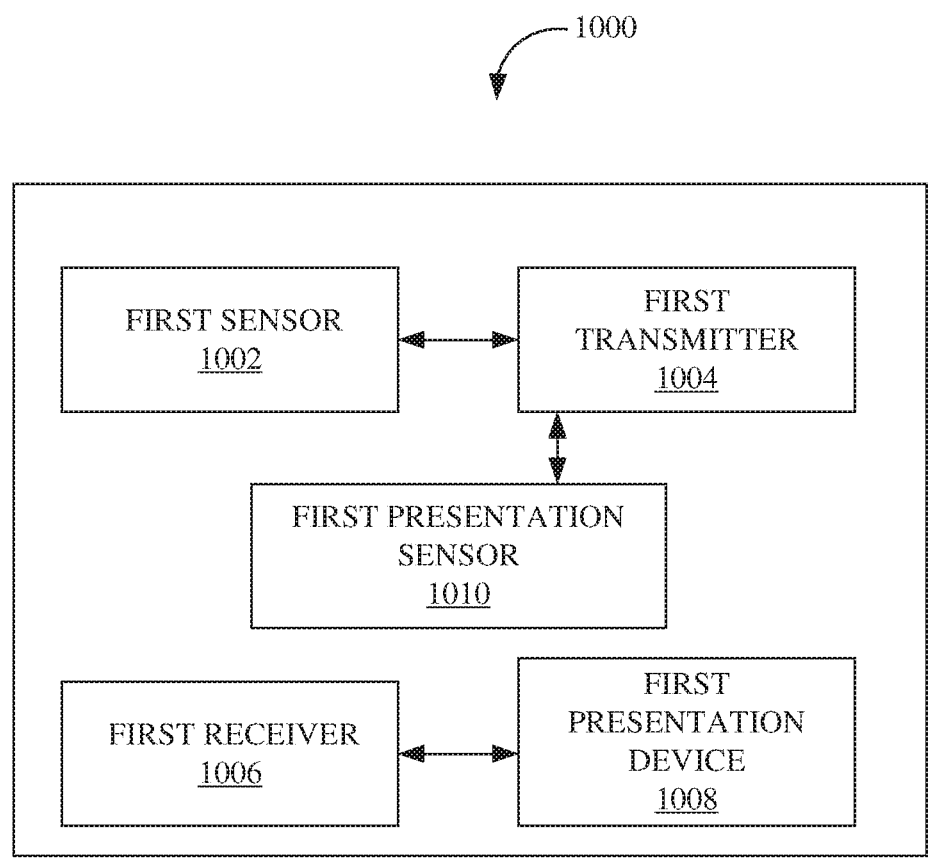
FIG. 10 is a block diagram of an apparatus for facilitating provisioning of a virtual experience in accordance with some embodiments.

FIG. 10 is a block diagram of an apparatus 1000 for facilitating provisioning of a virtual experience in accordance with some embodiments. The apparatus 1000 may include at least one first sensor 1002 (such as the at least one first sensor 810) configured for sensing at least one first sensor data associated with a first vehicle (such as the first vehicle 808).

Further, the apparatus 1000 may include at least one first presentation sensor 1010 (such as the at least one first presentation sensor 828) configured for sensing at least one first presentation sensor data associated with a first vehicle (such as the first vehicle 808). Further, in an embodiment, the at least one first presentation sensor 1010 may include a disturbance sensor, such as the disturbance sensor 208 configured for sensing a disturbance in a first spatial relationship between at least one first presentation device 1008 associated with the first vehicle, and a first user. Further, the spatial relationship between the at least one first presentation device 1008 and the first user may include at least one of a distance and an orientation. For instance, the first spatial relationship may include an exact distance, and an orientation, such as a precise angle between the at least one first presentation device 1008 and the eyes of the first user. Further, the disturbance in the first spatial relationship may include a change in the at least of the distance and the orientation between the at least one first presentation device 814 and the first user.

Further, the apparatus 1000 may include a first transmitter 1004 (such as the first transmitter 812) configured to be communicatively coupled to the at least first sensor 1002, and the at least one first presentation sensor 1010. Further, the first transmitter 1004 may be configured for transmitting the at least one first sensor data and the at least one first presentation sensor data to a communication device (such as the communication device 802) of a system over a first communication channel.

Further, the apparatus 1000 may include a first receiver 1006 (such as the first receiver 816) configured for receiving the at least one first optimized presentation data from the communication device over the first communication channel.

Further, the apparatus 1000 may include the at least one first presentation device 1008 (such as the at least one first presentation device 814) configured to be communicatively coupled to the first receiver 1006. The at least one first presentation device 1008 may be configured for presenting the at last one first optimized presentation data.

Further, the communication device may be configured for receiving at least one second sensor data corresponding to at least one second sensor (such as the at least one second sensor 820) associated with a second vehicle (such as the second vehicle 818). Further, the at least one second sensor may be communicatively coupled to a second transmitter (such as the second transmitter 822) configured for transmitting the at least one second sensor data over a second communication channel. Further, the system may include a processing device (such as the processing device 804) communicatively coupled to the communication device. Further, the processing device may be configured for generating the at least one first optimized presentation data based on the at least one second sensor data.

Figure 11:
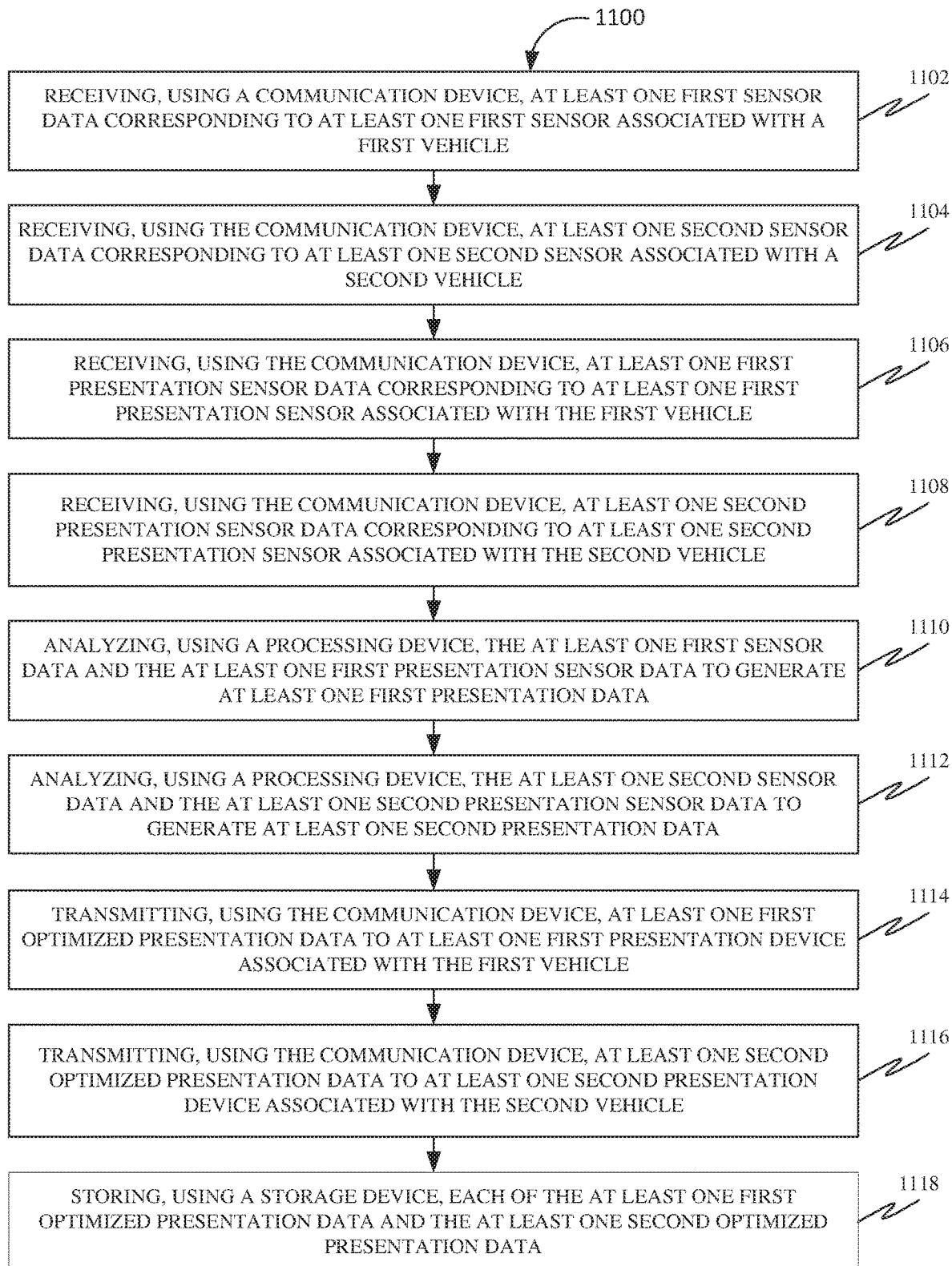
FIG. 11 is a flowchart of a method of facilitating provisioning of a virtual experience in accordance with some embodiments.

FIG. 11 is a flowchart of a method 1100 of facilitating provisioning of a virtual experience in accordance with some embodiments. At 1102, the method 1100 may include receiving, using a communication device (such as the communication device 802), at least one first sensor data corresponding to at least one first sensor (such as the at least one first sensor 810) associated with a first vehicle (such as the first vehicle 808). Further, the at least one first sensor may be communicatively coupled to a first transmitter (such as the first transmitter 812) configured for transmitting the at least one first sensor data over a first communication channel.

At 1104, the method 1100 may include receiving, using the communication device, at least one second sensor data corresponding to at least one second sensor (such as the at least one second sensor 820) associated with a second vehicle (such as the second vehicle 818). Further, the at least one second sensor may be communicatively coupled to a second transmitter (such as the second transmitter 822) configured for transmitting the at least one second sensor data over a second communication channel.

At 1106, the method 1100 may include receiving, using the communication device, a first presentation sensor data corresponding to at least one first presentation sensor 828 associated with the first vehicle. Further, the at least one first presentation sensor may be communicatively coupled to the first transmitter configured for transmitting the at least one first presentation sensor data over the first communication channel. Further, the first presentation sensor may include at least one sensor configured to monitor a movement of at least one first presentation device associated with the first vehicle, such as due to a G-Force, a frictional force, and an uneven movement of the first vehicle. For instance, the at least one first presentation sensor may include at least one camera configured to monitor a movement of the at least one first presentation device associated with the first vehicle. Further, the at least one first presentation sensor may include at least one accelerometer sensor configured to monitor an uneven movement of the at least one first presentation device associated with the first vehicle, such as due to a G-Force, a frictional force, and an uneven movement of the first vehicle. Further, the at least one first presentation sensor may include at least one gyroscope sensor configured to monitor an uneven orientation of the at least one first presentation device associated with the first vehicle, such as due to a G-Force, a frictional force, and an uneven movement of the first vehicle.

At 1108, the method 1100 may include receiving, using the communication device, a second presentation sensor data corresponding to at least one second presentation sensor 830 associated with the second vehicle. Further, the at least one second presentation sensor may be communicatively coupled to the second transmitter configured for transmitting the at least one second presentation sensor data over the second communication channel. Further, the second presentation sensor may include at least one sensor configured to monitor a movement of at least one second presentation device associated with the second vehicle, such as due to a G-Force, a frictional force, and an uneven movement of the second vehicle. For instance, the at least one second presentation sensor may include at least one camera configured to monitor a movement of the at least one second presentation device associated with the second vehicle. Further, the at least one second presentation sensor may include at least one accelerometer sensor configured to monitor an uneven movement of the at least one second presentation device associated with the second vehicle, such as due to a G-Force, a frictional force, and an uneven movement of the second vehicle. Further, the at least one second presentation sensor may include at least one gyroscope sensor configured to monitor an uneven orientation of the at least one second presentation device associated with the second vehicle, such as due to a G-Force, a frictional force, and an uneven movement of the second vehicle.

At 1110, the method 1100 may include analyzing, using a processing device, the at least one first sensor data and the at least one first presentation sensor data to generate at least one first modified presentation data. The analyzing may include determining an unwanted movement of the at least one first presentation device associated with the first vehicle, such as due to a G-Force, a frictional force, and an uneven movement of the first vehicle. Further, the unwanted movement of the at least one first presentation device associated with the first vehicle may include an upward movement, a downward movement, a leftward movement, and a rightward movement. Further, the generating of the at least one first optimized presentation data may be based on the unwanted movement of the at least one first presentation device associated with the first vehicle, such as due to a G-Force, a frictional force, and an uneven movement of the first vehicle. For instance, the generating of the at least one first optimized presentation data may be based on negating an effect of the unwanted movement of the at least one first presentation device associated with the first vehicle. For instance, if the unwanted movement of the at least one first presentation device associated with the first vehicle includes an upward movement, a downward movement, a leftward movement, and a rightward movement, the generating of the at least one first optimized presentation data may include moving one or more components of the at least one first modified presentation data in an oppositely downward direction, an upward direction, a rightward direction, and a leftward direction respectively.

At 1112, the method 1100 may include analyzing, using a processing device, the at least one second sensor data and the at least one second presentation sensor data to generate at least one second presentation data. The analyzing may include determining an unwanted movement of the at least one second presentation device associated with the second vehicle, such as due to a G-Force, a frictional force, and an uneven movement of the second vehicle. Further, the unwanted movement of the at least one second presentation device associated with the second vehicle may include an upward movement, a downward movement, a leftward movement, and a rightward movement. Further, the generating of the at least one second optimized presentation data may be based on the unwanted movement of the at least one second presentation device associated with the second vehicle, such as due to a G-Force, a frictional force, and an uneven movement of the second vehicle. For instance, the generating of the at least one second optimized presentation data may be based on negating an effect of the unwanted movement of the at least one second presentation device associated with the second vehicle. For instance, if the unwanted movement of the at least one second presentation device associated with the second vehicle includes an upward movement, a downward movement, a leftward movement, and a rightward movement, the generating of the at least one second optimized presentation data may include moving one or more components of the at least one second presentation data in an oppositely downward direction, an upward direction, a rightward direction, and a leftward direction respectively.

At 1114, the method 1100 may include transmitting, using the communication device, at least one first optimized presentation data to at least one first presentation device associated with the first vehicle. Further, the at least one first presentation device may include a first receiver (such as the first receiver 816) configured for receiving the at least one first modified presentation data over the first communication channel. Further, the at least one presentation device may be configured for presenting the at least one first optimized presentation data.

At 1116, the method 1100 may include transmitting, using the communication device, at least one second optimized presentation data to at least one second presentation device (such as the at least one second presentation device 824) associated with the second vehicle. Further, the at least one second presentation device may include a second receiver (such as the second receiver 826) configured for receiving the at least one second presentation data over the second communication channel. Further, the at least one presentation device may be configured for presenting the at least one second optimized presentation data.

At 1118, the method 1100 may include storing, using a storage device (such as the storage device 806), each of the at least one first optimized presentation data and the at least one second optimized presentation data.

Figure 12:
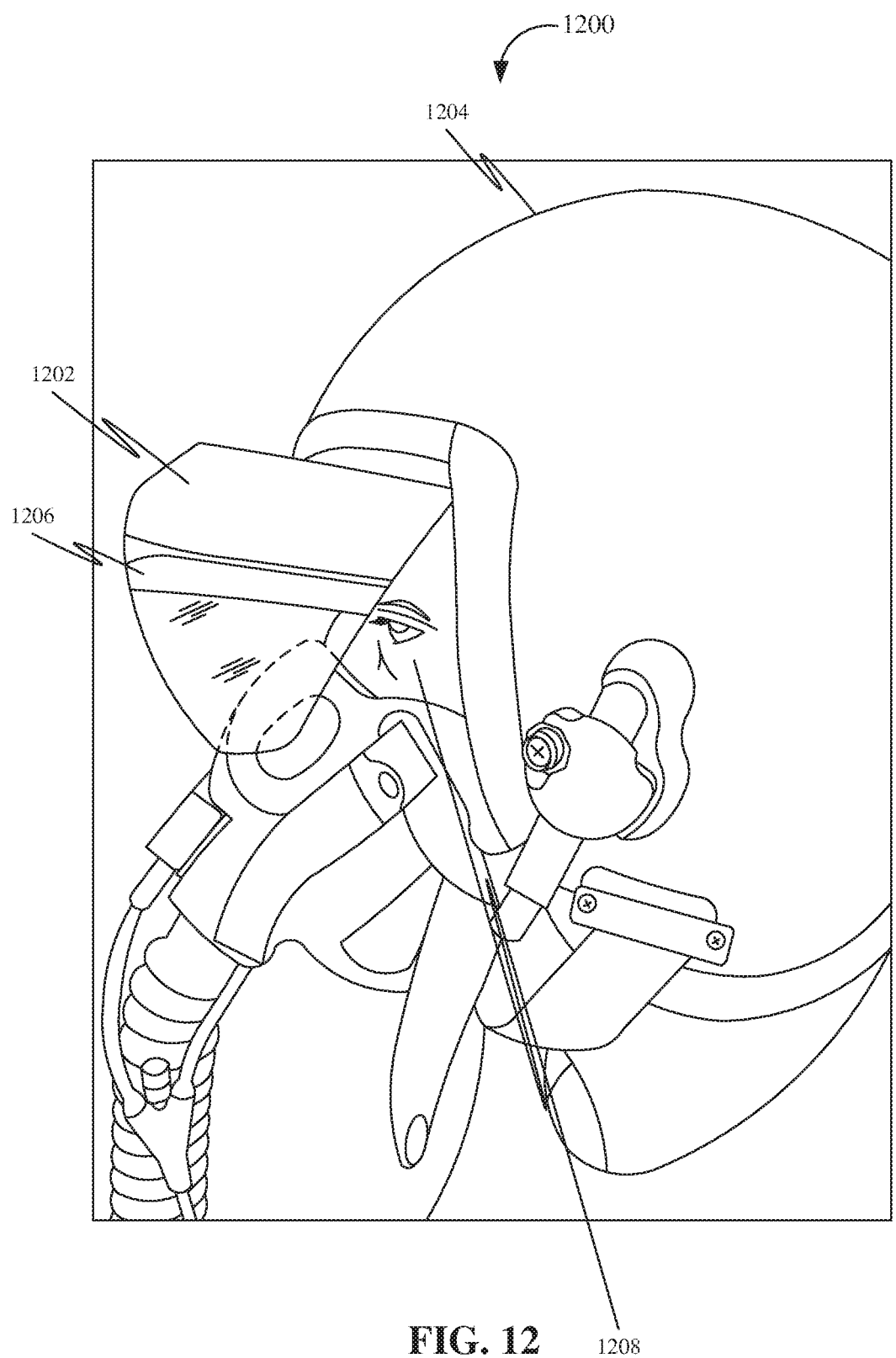
FIG. 12 shows an exemplary head mount display associated with a vehicle for facilitating provisioning of a virtual experience in accordance with some embodiments.

FIG. 12 shows an exemplary head mount display 1200 associated with a vehicle (such as the first vehicle 808) for facilitating provisioning of a virtual experience in accordance with some embodiments. Further, the vehicle may include a watercraft, a land vehicle, an aircraft and an amphibious vehicle. The head mount display 1200 associated with the vehicle may be worn by a user, such as a driver or operator of the vehicle while driving or operating the vehicle for facilitating provisioning of a virtual experience.

The head mount display 1200 may include a display device 1202 (such as the display device 906) to present visuals. The display device 1202 may include a first see-through display device.

Further, under motion, such as under extreme aerobatic maneuvers, such as G loading (gravity loading) the head mount display 1200 may experience one or more forces. Accordingly, a structure 1204 of the head mount display 1200 may exhibit slight movement, leading to the display device 1202 shifting from a desired position. For instance, the structure 1204 of the head mount display 1200 may be compressed onto the head of a user 1208 leading to a movement of the display device 1202, such as by 3-4 mm.

Further, the head mount display 1200 may include a presentation sensor 1206 (such as the first presentation sensor 828) configured for sensing at least one first physical variable (such as the movement) associated with the head mount display 1200, such as due to a G-Force, a frictional force, and an uneven movement of the vehicle. For instance, the presentation sensor 1206 may include at least one camera configured to monitor a movement, or compression of the head mount display 1200 associated with the vehicle. Further, the presentation sensor 1206 may include at least one accelerometer sensor configured to monitor an uneven movement of the head mount display 1200 associated with the vehicle, such as due to a G-Force, a frictional force, and an uneven movement of the vehicle. Further, the presentation sensor 1206 may include at least one gyroscope sensor configured to monitor an uneven orientation of the head mount display 1200 associated with the vehicle, such as due to a G-Force, a frictional force, and an uneven movement of the vehicle.

Further, the head mount display 1200 may include a transmitter (not shown—such as the first transmitter 812) configured to be communicatively coupled to the presentation sensor 1206. Further, the transmitter may be configured for transmitting the presentation sensor data to a communication device (such as the communication device 802) of a system over a communication channel.

Further, the head mount display 1200 may include a first receiver (not shown—such as the first receiver 816) configured to be communicatively coupled to the display device 1202. Further, the first receiver may be configured for receiving the at least one modified presentation data from the communication device over the communication channel. Further, the modified presentation data may negate the slight movement of the head mount display 1200, leading to the display device 1202 shifting from the desired position.

Further, the communication device may be configured for receiving at least one second sensor data corresponding to at least one second sensor (such as the at least one second sensor 820) associated with a second vehicle (such as the second vehicle 818).

Further, the at least one second sensor may be communicatively coupled to a second transmitter (such as the second transmitter 822) configured for transmitting the at least one second sensor data over a second communication channel. Further, the system may include a processing device (such as the processing device 804) communicatively coupled to the communication device. Further, the processing device may be configured for generating the presentation data based on the at least one second sensor data.

Figure 13:
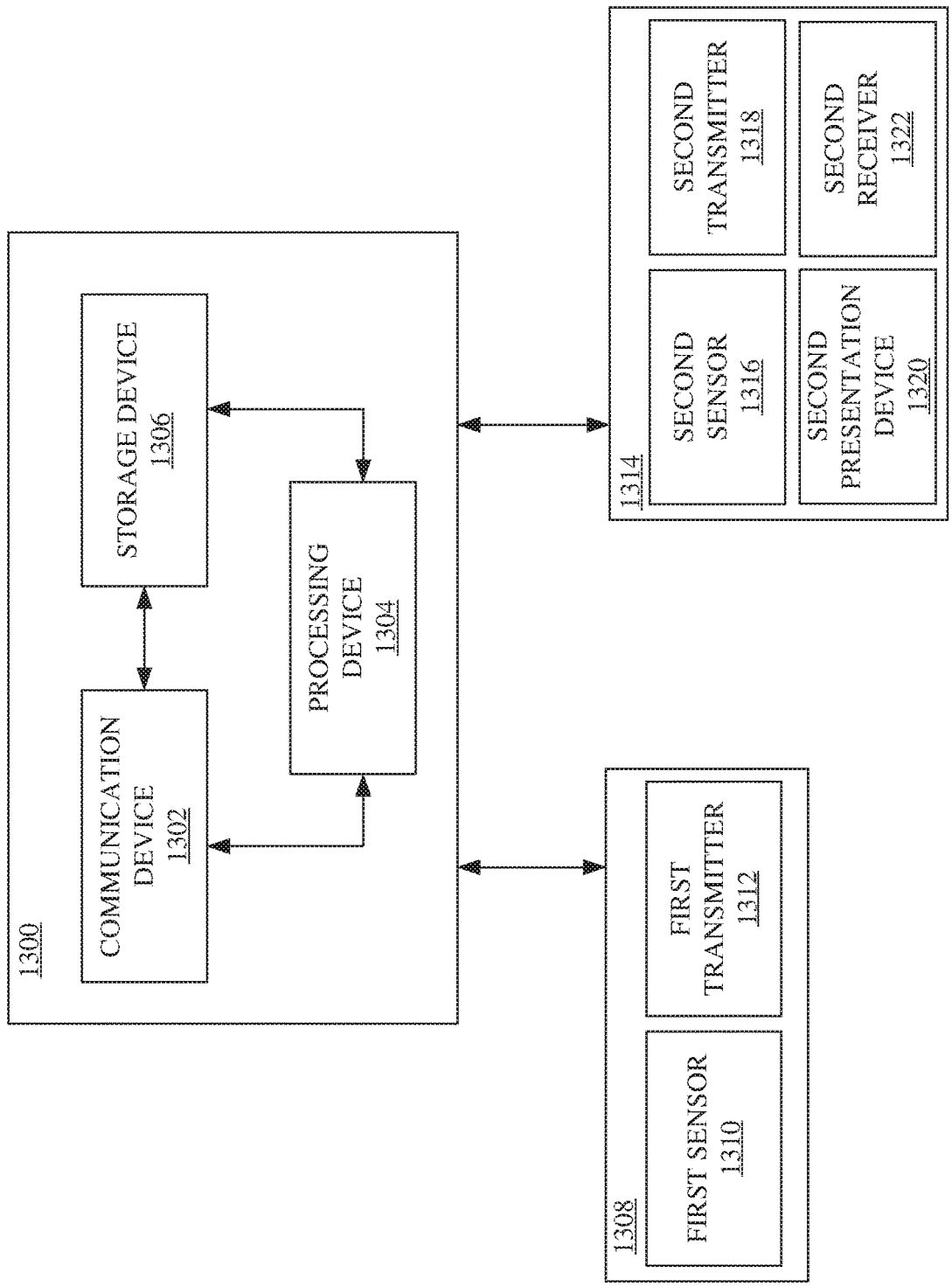
FIG. 13 shows a system for facilitating provisioning of a virtual experience, in accordance with some embodiments.

FIG. 13 shows a system 1300 for facilitating provisioning of a virtual experience, in accordance with some embodiments. The system 1300 may include a communication device 1302 configured for receiving at least one first sensor data corresponding to at least one first sensor 1310 associated with a first vehicle 1308. Further, the at least one first sensor 1310 may be communicatively coupled to a first transmitter 1312 configured for transmitting the at least one first sensor data over a first communication channel.

Further, the communication device 1302 may be configured for receiving at least one second sensor data corresponding to at least one second sensor 1316 associated with a second vehicle 1314. Further, the at least one second sensor 1316 may include a second location sensor configured to detect a second location associated with the second vehicle 1314. Further, the at least one second sensor 1316 may be communicatively coupled to a second transmitter 1318 configured for transmitting the at least one second sensor data over a second communication channel. Further, in some embodiments, the at least one second sensor 1316 may include a second user sensor configured for sensing a second user variable associated with a second user of the second vehicle 1314. Further, the second user variable may include a second user location and a second user orientation.

Further, in some embodiments, the at least one second sensor 1316 may include a disturbance sensor, such as the disturbance sensor 208 configured for sensing a disturbance in a spatial relationship between a second presentation device 1320 associated with the second vehicle 1314 and the second user of the second vehicle 1314. Further, the spatial relationship between the second presentation device 1320 and the second user may include at least one of a distance and an orientation. For instance, the spatial relationship may include an exact distance, and an orientation, such as a precise angle between the second presentation device 1320 and the eyes of the second user.

Further, the disturbance in the spatial relationship may include a change in the at least of the distance and the orientation between the second presentation device 1320 and the second user. Further, the disturbance in the spatial relationship may lead to an alteration in how the second user may view at least one second presentation data. For instance, if the disturbance in the spatial relationship leads to a reduction in the distance between the second presentation device 1320 and the second user, the second user may perceive one or more objects in the at least one second presentation data to be closer. For instance, if the spatial relationship between the second presentation device 1320 and the second user specifies a distance of "x" centimeters, and the disturbance in the spatial relationship leads to a reduction in the distance between the second presentation device 1320 and the second user to "y" centimeters, the second user may perceive the at least one second presentation data to be closer by "x-y" centimeters.

Further, the communication device 1302 may be configured for transmitting the at least one second presentation data to the at least one second presentation device 1320 associated with the second vehicle 1314. Further, the at least one second presentation data may include at least one second virtual object model corresponding to at least one second virtual object. Further, in some embodiments, the at least one second virtual object may include one or more of a navigational marker and an air-corridor.

Further, in an embodiment, the at least one second presentation data may include a second corrected display data generated based on a second correction data. Further, the at least one second presentation device 1320 may include a second receiver 1322 configured for receiving the at least one second presentation data over the second communication channel. Further, the at least one second presentation device 1320 may be configured for presenting the at least one second presentation data. Further, in some embodiments, the at least one second presentation device 1320 may include a second head mount display. Further, the second head mount display may include a second user location sensor of the at least one second sensor 1316 configured for sensing the second user location and a second user orientation sensor of the at least one second sensor 1316 configured for sensing the second user orientation. Further, the second head mount display may include a second see-through display device.

Figure 14:
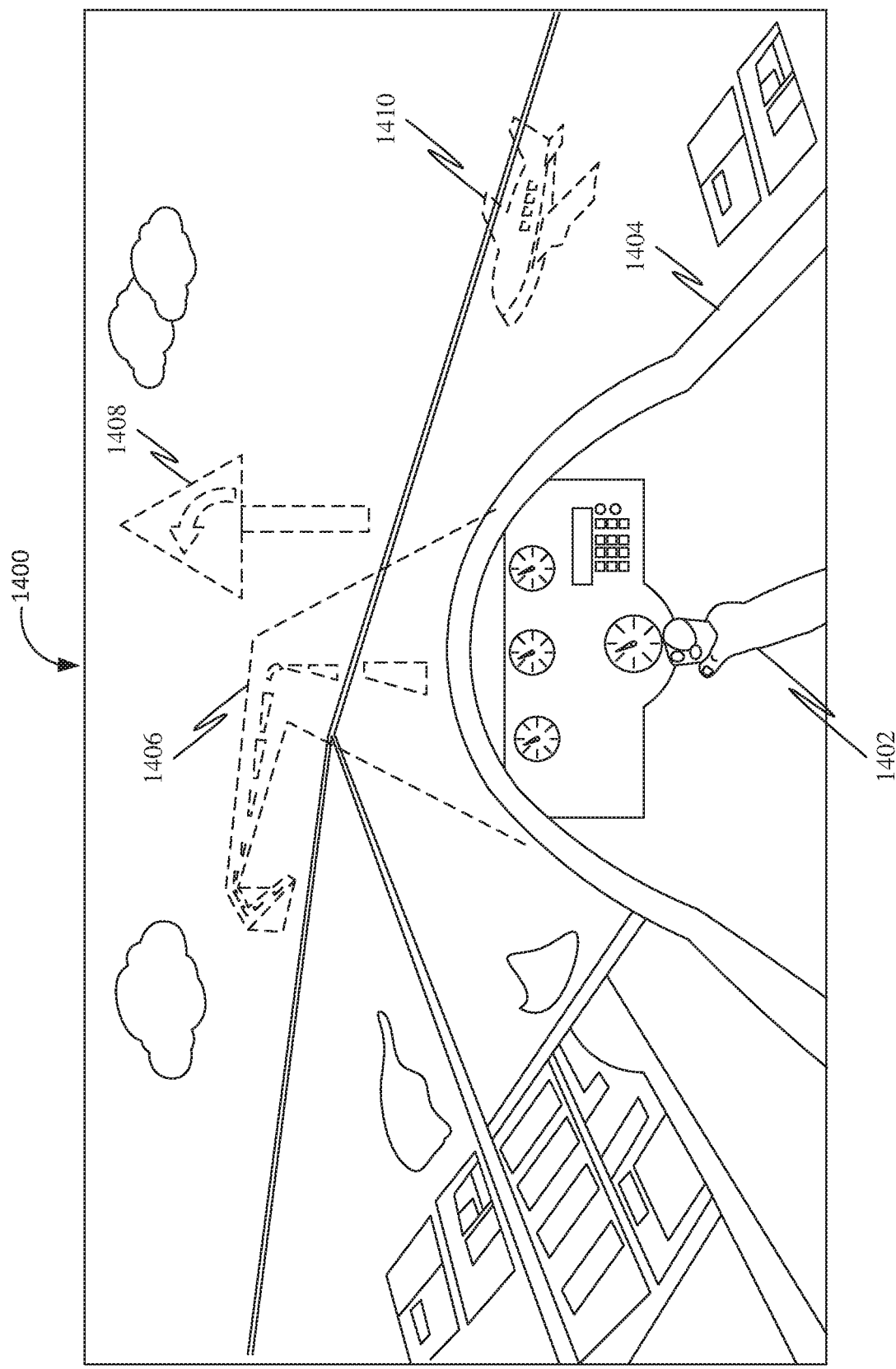
FIG. 14 shows a corrected augmented reality view 1400, in accordance with some embodiments.

Further, in some embodiments, the at least one second virtual object model may include a corrected augmented reality view, such as the corrected augmented reality view 1400. Further, the augmented reality view 1400 may include one or more second virtual objects such as a navigational marker 1408, and a skyway 1406 as shown in FIG. 14).

Further, the system 1300 may include a processing device 1304 configured for generating the at least one second presentation data based on the at least one first sensor data and the at least one second sensor data. Further, the generating of the at least one second virtual object model may be independent of the at least one first sensor data. Further, in some embodiments, the processing device 1304 may be configured for determining a second airspace class (with reference to FIG. 15) associated with the second vehicle 1314 based on the second location including a second altitude associated with the second vehicle 1314. Further, the generating of the at least one second virtual object model may be based on the second airspace class.

Further, the processing device 1304 may be configured for generating the second correction data based on the analyzing the at least one second sensor data associated with the second vehicle 1314. Further, the second correction data may include an instruction to shift a perspective view of the at least one second presentation data to compensate for the disturbance in the spatial relationship between the second presentation device 1320 and the second user. Accordingly, the second correction data may be generated contrary to the disturbance in the spatial relationship. For instance, the disturbance may include an angular disturbance, wherein the second presentation device 1320 may undergo an angular displacement as a result of the angular disturbance. Accordingly, the second correction data may include an instruction of translation to generate the second corrected display data included in the second presentation data to compensate for the angular disturbance.

For instance, if the at least one second presentation data includes the at least one second virtual object model may include a corrected augmented reality view, such as the corrected augmented reality view 1400, the second correction data may include an instruction to shift a perspective view of the at least one second presentation data to compensate for the disturbance in the spatial relationship between the second presentation device 1320 and the second user (such as a pilot 1402). For instance, if the disturbance in the spatial relationship includes a reduction in the distance between the second presentation device 1320, the second correction data may include an instruction to shift a perspective view of the at least one second presentation data to compensate for the disturbance in the spatial relationship between the second presentation device 1320 and the second user, such as by projection of the one or more second virtual objects, such as the navigational marker 1408, and the skyway 1406 at a distance to compensate the disturbance and to generate the corrected augmented reality view 1400\

Further, the system 1300 may include a storage device 1306 configured for storing the at least one second presentation data. Further, in some embodiments, the storage device 1306 may be configured for retrieving the at least one second virtual object model based on the second location associated with the second vehicle 1314. Further, in some embodiments, the storage device 1306 may be configured for storing a first three-dimensional model corresponding to the first vehicle 1308. Further, the generating of the second presentation data may be based on the first three-dimensional model.

Further, in some embodiments, the communication device 1302 may be configured for receiving an administrator command from an administrator device. Further, the generating of the at least one second virtual object model may be based on the administrator command.

Further, in some embodiments, the communication device 1302 may be configured for transmitting at least one first presentation data to at least one first presentation device (not shown) associated with the first vehicle 1308. Further, the at least one first presentation device may include a first receiver configured for receiving the at least one first presentation data over the first communication channel. Further, the at least one first presentation device may be configured for presenting the at least one first presentation data. Further, in some embodiments, the processing device 1304 may be configured for generating the at least one first presentation data based on the at least one second sensor data. Further, in some embodiments, the storage device 1306 may be configured for storing the at least one first presentation data. Further, in some embodiments, the storage device 1306 may be configured for storing a second three-dimensional model corresponding to the second vehicle 1314. Further, the generating of the first presentation data may be based on the second three-dimensional model.

Further, in some embodiments, the at least one first presentation data may include at least one first virtual object model corresponding to at least one first virtual object. Further, the generating of the at least one first virtual object model may be independent of the at least one second sensor data. Further, the storage device 1306 may be configured for storing the at least one first virtual object model.

Figure 15:
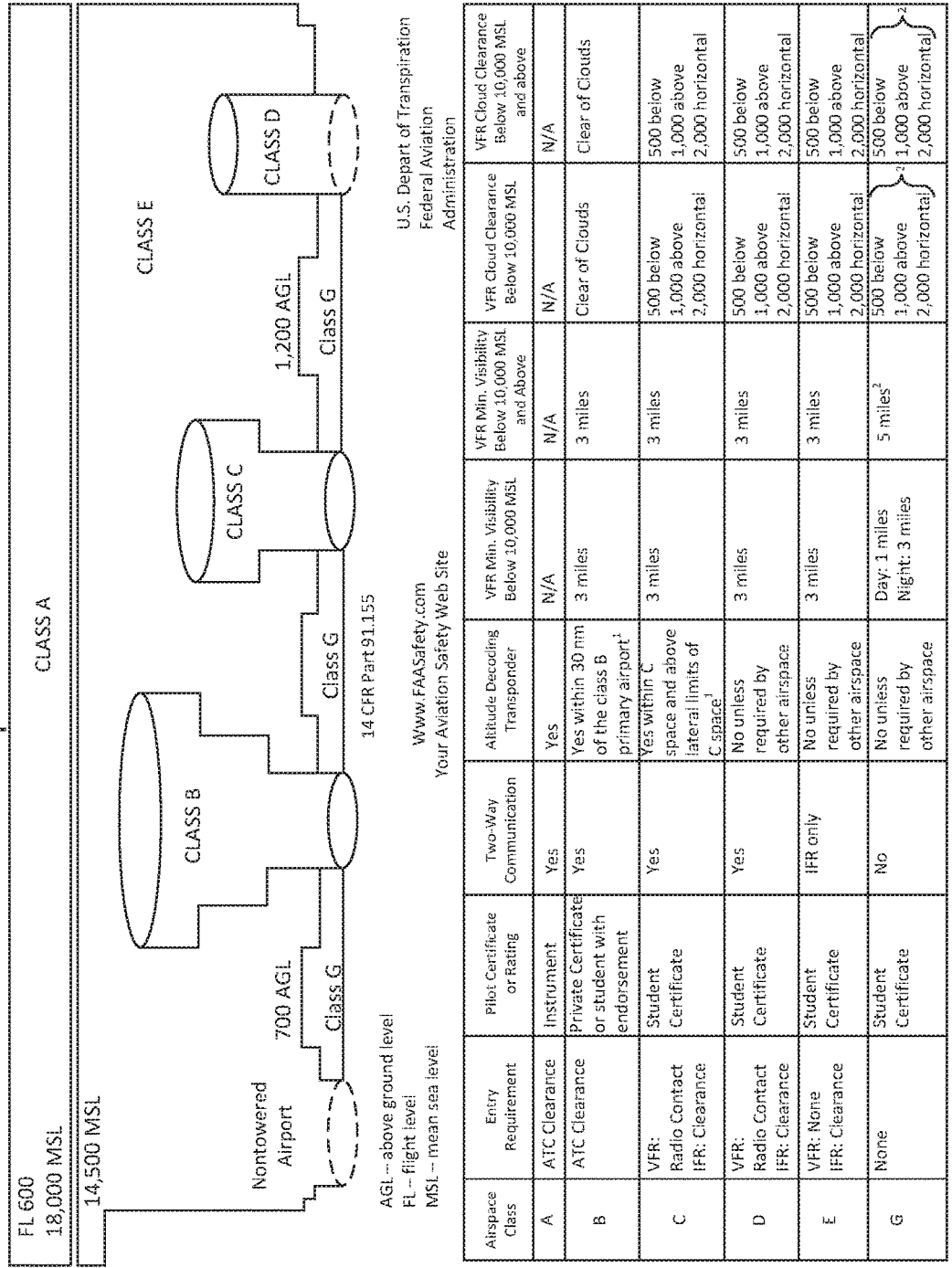
FIG. 15 shows a chart related to the United States airspace system's classification scheme
Figure 16:
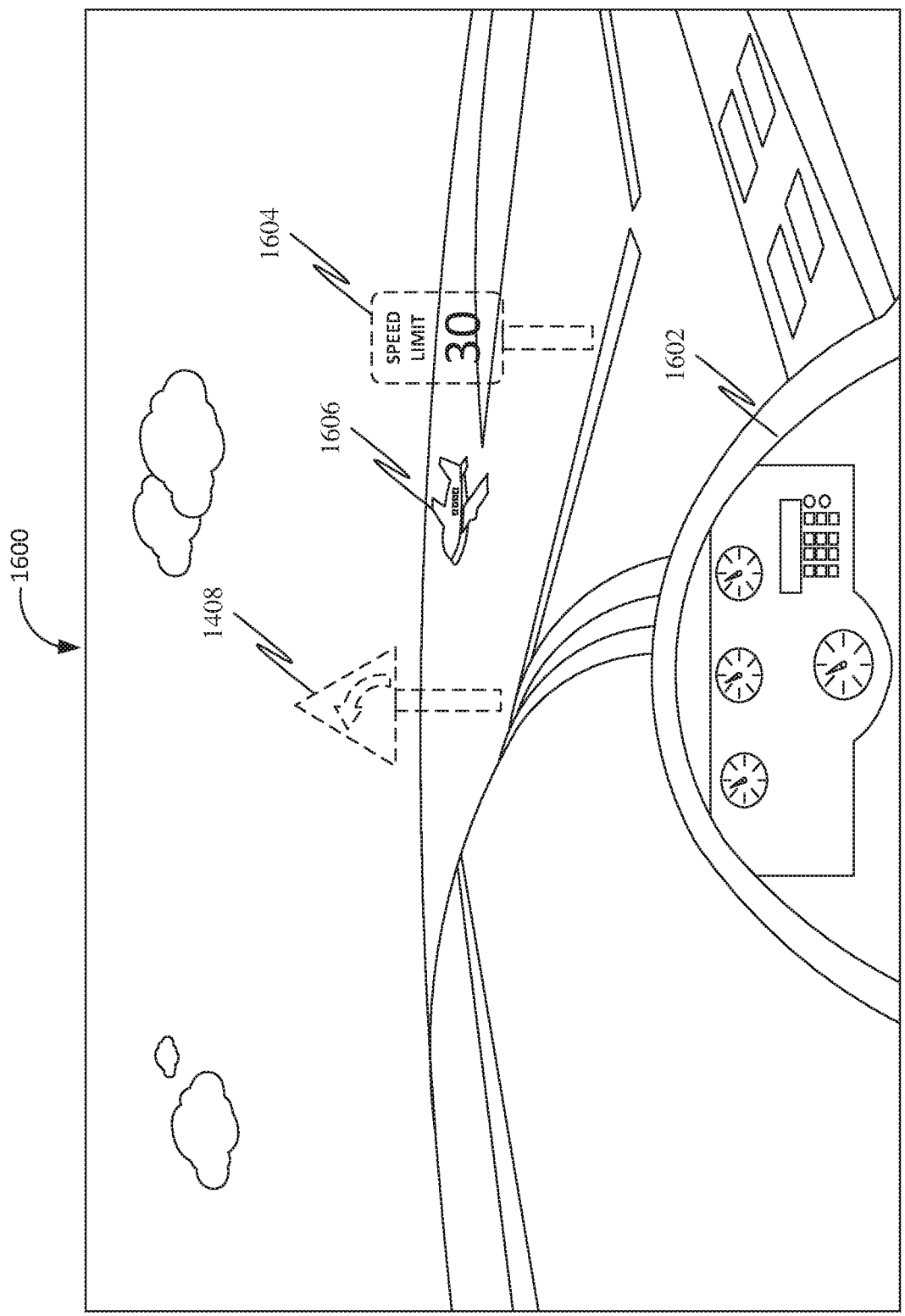
FIG. 16 shows an augmented reality view shown to a real pilot while a civilian aircraft is taxiing at an airport, in accordance with an exemplary embodiment.

Further, in some exemplary embodiment, the communication device 1302 may be configured for receiving at least one second sensor data corresponding to at least one second sensor 1316 associated with a second vehicle 1314. Further, the at least one second sensor 1316 may be communicatively coupled to a second transmitter 1318 configured for transmitting the at least one second sensor data over a second communication channel. Further, the communication device 1302 may be configured for receiving at least one first sensor data corresponding to at least one first sensor 1310 associated with a first vehicle 1308. Further, the at least one first sensor 1310 may include a first location sensor configured to detect a first location associated with the first vehicle 1308. Further, the at least one first sensor 1310 may be communicatively coupled to a first transmitter 1312 configured for transmitting the at least one first sensor data over a first communication channel. Further, in some embodiments, the at least one first sensor 1310 may include a first user sensor configured for sensing a first user variable associated with a first user of the first vehicle 1308. Further, the first user variable may include a first user location and a first user orientation. Further, the communication device 1302 configured for transmitting at least one first presentation data to at least one first presentation device (not shown) associated with the first vehicle 1308. Further, the at least one first presentation data may include at least one first virtual object model corresponding to at least one first virtual object. Further, in some embodiments, the at least one first virtual object may include one or more of a navigational marker (such as a navigational marker 1308, and/or a signboard 1604 as shown in FIG. 16) and an air-corridor (such as a skyway 1306 as shown in FIG. 13). Further, the at least one first presentation device may include a first receiver configured for receiving the at least one first presentation data over the first communication channel. Further, the at least one first presentation device may be configured for presenting the at least one first presentation data. Further, in some embodiments, the at least one first presentation device may include a first head mount display. Further, the first head mount display may include a first user location sensor of the at least one first sensor 1310 configured for sensing the first user location and a first user orientation sensor of the at least one first sensor 1310 configured for sensing the first user orientation. Further, the first head mount display may include a first see-through display device. Further, the processing device 1304 may be configured for generating the at least one first presentation data based on the at least one second sensor data and the at least one first sensor data. Further, the generating of the at least one first virtual object model may be independent of the at least one second sensor data. Further, in some embodiments, the processing device 1304 may be configured for determining a first airspace class (with reference to FIG. 15) associated with the first vehicle 1308 based on the first location including a first altitude associated with the first vehicle 1308. Further, the generating of the at least one first virtual object model may be based on the first airspace class. Further, in some embodiments, the storage device 1306 may be configured for storing the at least one first presentation data. Further, in some embodiments, the storage device 1306 may be configured for retrieving the at least one first virtual object model based on the first location associated with the first vehicle 1308. Further, in some embodiments, the storage device 1306 may be configured for storing a second three-dimensional model corresponding to the second vehicle 1314. Further, the generating of the first presentation data may be based on the second three-dimensional model. Further, in some embodiments, the communication device 1302 may be configured for receiving an administrator command from an administrator device. Further, the generating of the at least one first virtual object model may be based on the administrator command. Further, in some embodiments, the communication device 1302 may be configured for transmitting at least one second presentation data to at least one second presentation device (such as the second presentation device 1320) associated with the second vehicle 1314. Further, the at least one second presentation device may include a second receiver (such as the second receiver 1322) configured for receiving the at least one second presentation data over the second communication channel. Further, the at least one second presentation device may be configured for presenting the at least one second presentation data. Further, in some embodiments, the processing device 1304 may be configured for generating the at least one second presentation data based on the at least one first sensor data. Further, in some embodiments, the storage device 1306 may be configured for storing the at least one second presentation data. Further, in some embodiments, the storage device 1306 may be configured for storing a first three-dimensional model corresponding to the first vehicle 1308. Further, the generating of the second presentation data may be based on the first three-dimensional model. Further, in some embodiments, the at least one second presentation data may include at least one second virtual object model corresponding to at least one second virtual object. Further, the generating of the at least one second virtual object model may be independent of the at least one first sensor data. Further, the storage device 1306 may be configured for storing the at least one second virtual object model.

FIG. 14 shows the corrected augmented reality view 1400. Further, the augmented reality view 1400 may include a road drawn in the sky (such as the skyway 1406) indicating a path that a civilian aircraft 1404 may take in order to land at an airport. Further, the augmented reality view 1400 may include the navigation marker 1408 indicating to a pilot 1402 that the civilian aircraft 1404 should take a left turn. The navigation marker 1408 may assist the pilot 1402 in navigating towards a landing strip to land the civilian aircraft 1404.

Therefore, the corrected augmented reality view 1400 may provide pilots with a similar view as seen by public transport drivers (e.g. taxi or bus) on the ground. The pilots (such as the pilot 1402) may see roads (such as the skyway 1406) that the pilot 1402 need to drive on. Further, the pilot 1402, in an instance, may see signs just like a taxi driver who may just look out of a window and see road signs.

Further, the corrected augmented reality view 1400 may include (but not limited to) one or more of skyways (such the skyway 1406), navigation markers (such as the navigation marker 1408), virtual tunnels, weather information, an air corridor, speed, signboards for precautions, airspace class, one or more parameters shown on a conventional horizontal situation indicator (HSI) etc. The skyways may indicate a path that an aircraft (such as the civilian aircraft 1404) should take. The skyways may appear similar to roads on the ground. The navigation markers may be similar to regulatory road signs used on the roads on the ground. Further, the navigation markers may instruct pilots (such as the pilot 1402) on what they must or should do (or not do) under a given set of circumstances. Further, the navigation markers may be used to reinforce air-traffic laws, regulations or requirements which apply either at all times or at specified times or places upon a flight path. For example, the navigation markers may include one or more of a left curve ahead sign, a right curve ahead sign, a keep left sign, and a keep to right sign. Further, the virtual tunnels may appear similar to tunnels on roads on the ground. The pilot 1402 may be required to fly the aircraft through the virtual tunnel. Further, the weather information may include real-time weather data that affects flying conditions. For example, the weather information may include information related to one or more of wind speed, gust, and direction; variable wind direction; visibility, and variable visibility; temperature; precipitation; and cloud cover. Further, the air corridor may indicate an air route along which the aircraft is allowed to fly, especially when the aircraft is over a foreign country. Further, the corrected augmented reality view 1400 may include speed information. The speed information may include one or more of a current speed, a ground speed, and a recommended speed. The signboards for precautions may be related to warnings shown to the pilot 1402. The one or more parameters shown on a conventional horizontal situation indicator (HSI) include NAV warning flag, lubber line, compass warning flag, course select pointer, TO/FROM indicator, glideslope deviation scale, heading select knob, compass card, course deviation scale, course select knob, course deviation bar (CDI), symbolic aircraft, dual glideslope pointers, and heading select bug.

Further, in some embodiments, information such as altitude, attitude, airspeed, the rate of climb, heading, autopilot and auto-throttle engagement status, flight director modes and approach status etc. that may be displayed on a conventional primary flight display may also be displayed in the corrected augmented reality view 1400.

Further, in some embodiments, the corrected augmented reality view 1400 may include a one or more of other vehicles (such as another airplane 1410). Further, the one or more other vehicles, in an instance, may include one or more live vehicles (such as representing real pilots flying real aircraft), one or more virtual vehicles (such as representing real people on the ground, flying virtual aircraft), and one or more constructed vehicles (such as representing aircraft generated and controlled using computer graphics and processing systems).

Further, the corrected augmented reality view 1400 may include an airspace. FIG. 15 is a chart related to the United States airspace system's classification scheme. Specifically, FIG. 15 illustrates various parameters related to one or more classes defined in the United States airspace system's classification scheme. The classification scheme is intended to maximize pilot flexibility within acceptable levels of risk appropriate to the type of operation and traffic density within that class of airspace—in particular, to provide separation and active control in areas of dense or high-speed flight operations. The Albert Roper (1919-10-13 The Paris Convention) implementation of International Civil Aviation Organization (ICAO) airspace classes defines classes A through G (with the exception of class F which is not used in the United States).

For an instance, a computing device (such as the computing device 1600) may analyze one or more parameters such as altitude, Visual Flight Rules (VFR), Instrument Flight Rules (IFR), VFR cloud clearance, and VFR minimum visibility etc. to determine an applicable airspace class. Further, the determined airspace class may be displayed on the virtual reality display. Further, the applicable airspace class may be determined using a location tracker such as a GPS and may be displayed as a notification on the virtual reality display.

Further, a special use airspace class may be determined. The special use airspace class may include alert areas, warning areas, restricted areas, prohibited airspace, military operation area, national security area, controlled firing areas etc. For an instance, if an aircraft (such as the civilian aircraft 1404) enters a prohibited area by mistake, then a notification may be displayed in the corrected augmented reality view 1400. Accordingly, the pilot 1402 may reroute the aircraft towards a permitted airspace.

Further, the corrected augmented reality view 1400 may include one or more live aircraft (representing real pilots flying real aircraft), one or more virtual aircraft (representing real people on the ground, flying virtual aircraft) and one or more constructed aircraft (representing aircraft generated and controlled using computer graphics and processing systems). Further, the corrected augmented reality view 1400 shown to a pilot (such as the pilot 1402) in a first aircraft (such as the civilian aircraft 1404) may be modified based on sensor data received from another aircraft (such as another airplane 1410). The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

FIG. 16 shows an augmented reality view 1600 shown to a real pilot while a civilian aircraft 1602 is taxiing at an airport, in accordance with an exemplary embodiment. The augmented reality view 1600 may include one or more navigational markers (such as the navigation marker 1408) and signboards (such as a signboard 1604) that assist a pilot to taxi the civilian aircraft 1602 at the airport. The navigational markers may indicate the direction of movement. The signboards may indicate the speed limits.

The augmented reality view 1600 may help the pilot to taxi the civilian aircraft 1602 towards a parking location after landing. Further, augmented reality view 1600 may help the pilot to taxi the civilian aircraft 1602 towards a runway for taking-off. Therefore, a ground crew may no longer be required to instruct the pilot while taxiing the civilian aircraft 1602 at the airport.

Further, the augmented reality view 1600 may include one or more live aircraft (such as a live aircraft 1606) at the airport (representing real pilots in real aircraft), one or more virtual aircraft at the airport (representing real people on the ground, controlling a virtual aircraft) and one or more constructed aircraft at the airport (representing aircraft generated and controlled using computer graphics and processing systems). Further, the augmented reality view 1600 shown to a pilot in a first aircraft may be modified based on sensor data received from another aircraft. The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

Figure 17:
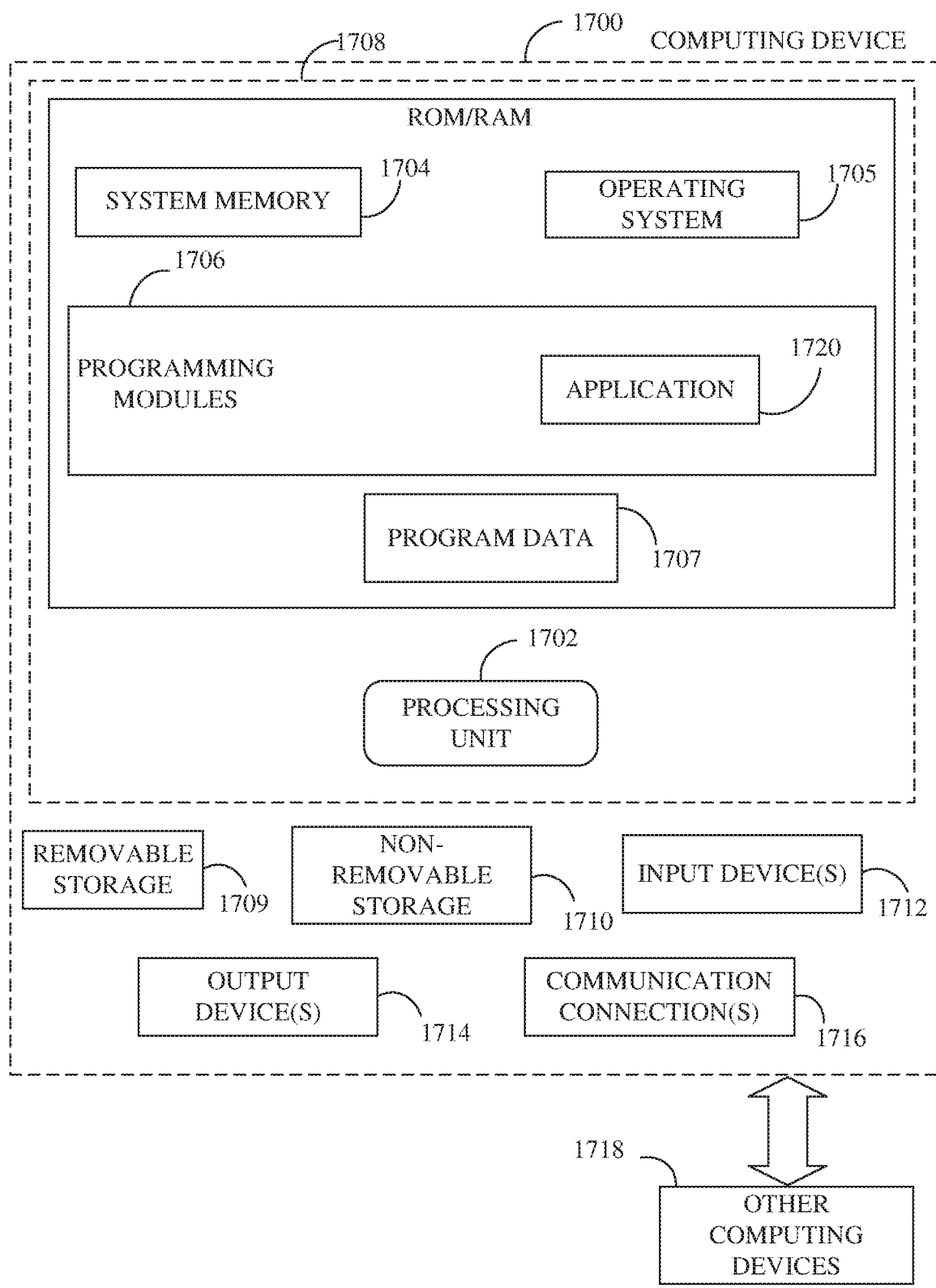
FIG. 17 is a block diagram of a computing device for implementing the methods disclosed herein, in accordance with some embodiments.

With reference to FIG. 17, a system consistent with an embodiment of the disclosure may include a computing device or cloud service, such as computing device 1700. In a basic configuration, computing device 1700 may include at least one processing unit 1702 and a system memory 1704. Depending on the configuration and type of computing device, system memory 1704 may include, but is not limited to, volatile (e.g. random-access memory (RAM)), non-volatile (e.g. read-only memory (ROM)), flash memory, or any combination. System memory 1704 may include operating system 1705, one or more programming modules 1706, and may include a program data 1707. Operating system 1705, for example, may be suitable for controlling computing device 1700's operation. In one embodiment, programming modules 1706 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 17 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and nonvolatile, removable and non-removable media implemented in any method or technology for storage of information, such as computer-readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, a location sensor, a camera, a biometric sensor, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1704, including operating system 1705. While executing on processing unit 1702, programming modules 1706 (e.g., application 1720 such as a media player) may perform processes including, for example, one or more stages of methods, algorithms, systems, applications, servers, databases as described above. The aforementioned process is an example, and processing unit 1702 may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A wearable display device for facilitating provisioning of a virtual experience, the wearable display device comprising:
    a support member configured to be mounted on a user, wherein the support member comprises a head gear configured to be mounted on a head of the user, wherein the head gear comprises a shell configured to accommodate at least a part of a head of the user, wherein the shell comprises an interior layer, an exterior layer and a deformable layer;
    a display device attached to the support member, wherein the display device is configured for displaying at least one display data;
    at least one disturbance sensor configured for sensing a disturbance in a spatial relationship between the display device and the user, wherein the at least one disturbance sensor comprises a deformation sensor configured for sensing a deformation of the deformable layer, wherein the deformation of the deformable layer leads to the disturbance in the spatial relationship between the display device and user;
    a processing device communicatively coupled with the display device, wherein the processing device is configured for:
        receiving the at least one display data;
        analyzing the disturbance in the spatial relationship;
        generating a correction data based on the analyzing; and
        generating a corrected display data based on the at least one display data and the correction data.

2. The wearable display device of claim 1, wherein the head gear comprises a helmet configured to be worn over a crown of the head.

3. The wearable display device of claim 1, wherein a shape of the shell defines a concavity to facilitate accommodation of the at least the part of the head, wherein the deformable layer is disposed in between the interior layer and the exterior layer, wherein the deformable layer is configured to provide cushioning, wherein the display device is attached to at least one of the interior layer and the exterior layer.

4. The wearable display device of claim 3, wherein the disturbance in the spatial relationship is based on deformation of the deformable layer due to an acceleration of the head gear, wherein the spatial relationship comprises at least one vector representing at least one position of at least one part of the display device in relation to at least one eye of the user, wherein a vector of the at least one vector is characterized by an orientation and a distance.

5. The wearable display device of claim 1, wherein the at least one disturbance sensor further comprises a camera disposed on the display device, wherein the camera is configured to capture an image of at least a part of a face of the user, wherein at least the part of the face comprises at least on eye, wherein the wearable display device further comprises a calibration input device configured to receive a calibration input, wherein the camera is further configured to capture a reference image of at least the part of the face of the user based on receiving the calibration input, wherein the calibration input is received in an absence of the disturbance, wherein the analyzing of the disturbance comprises comparing the reference image with a current image of at least the part of the face of the user, wherein the current image is captured by the camera in a presence of the disturbance, wherein determining the correction data comprises determining at least one spatial parameter change based on the comparing, wherein the at least one spatial parameter change corresponds to at least one of a displacement of at least the part of the face relative to the camera and a rotation, about at least one axis, of at least the part of the face relative to the camera, wherein the at least one spatial parameter change is independent of a gaze of the at least one eye of the user in relation to the display device.

6. The wearable display device of claim 5, wherein the generating of the corrected display data comprises applying at least one image transform on the at least one display data based on the at least one spatial parameter change.

7. The wearable display device of claim 1, wherein the display device comprises a see-through display device configured to allow the user to view a physical surrounding of the wearable device.

8. The wearable display device of claim 1, wherein the at least one display data comprises at least one object model associated with at least one object, wherein the generating of the corrected display data comprises applying at least one transformation to the at least one object model based on the correction data.

9. The wearable display device of claim 1 further comprising at least one actuator coupled to the display device and the support member, wherein the at least one actuator is configured for modifying the spatial relationship based on a correction data.

* * * * *